United States Patent [19]

Macy et al.

[11] Patent Number: 4,930,351
[45] Date of Patent: Jun. 5, 1990

[54] VIBRATORY LINEAR ACCELERATION AND ANGULAR RATE SENSING SYSTEM

[75] Inventors: David F. Macy, Mission Viejo; Evert C. Alsenz, Newport Beach, both of Calif.

[73] Assignee: WJM Corporation, Laguna Hills, Calif.

[21] Appl. No.: 172,380

[22] Filed: Mar. 24, 1988

[51] Int. Cl.$^5$ .............................................. G01P 9/04
[52] U.S. Cl. ...................................... 73/505; 73/510; 73/517 AV
[58] Field of Search ..................... 73/505, 510, 517 R, 73/517 AV

[56] References Cited

U.S. PATENT DOCUMENTS

| | | |
|---|---|---|
| 3,209,601 | 10/1965 | Stiles . |
| 3,319,472 | 5/1967 | Reefman . |
| 3,465,597 | 9/1969 | Riordan et al. . |
| 4,091,679 | 5/1978 | Furusawa et al. . |
| 4,144,747 | 3/1979 | Datwyler, Jr. . |
| 4,215,570 | 8/1980 | Eer Nisse . |
| 4,372,173 | 2/1983 | Eer Nisse et al. . |
| 4,524,619 | 6/1985 | Staudte ................................. 73/505 |
| 4,538,461 | 9/1985 | Juptner et al. ........................ 73/505 |
| 4,654,663 | 3/1987 | Alsenz et al. ......................... 73/505 |
| 4,750,364 | 6/1988 | Kawamura et al. ................. 73/505 |

*Primary Examiner*—John Chapman
*Attorney, Agent, or Firm*—Knobbe, Martens, Olson, & Bear

[57] ABSTRACT

An inertial sensing system includes a geometric structure having several independent mechanically resonant modes of vibration such that when the structure is subjected to outside inertial motions that are to be sensed, a driven mode of vibration will couple energy in a specific manner into a pickup mode. The driven mode serves as a reference motion. The system measures angular rotation rate by sensing the vibrations in the pickup mode caused by the action of the Coriolis effect on the balanced driven mode which couples energy into the pickup mode. The system includes a portion of the geometric structure that is subject to strain caused by linear acceleration in one direction. The strain introduces an imbalance in the driven mode which causes energy to be coupled to the pickup mode of vibration in a nominally linear manner. A sensing circuit is provided to sense the amount of energy coupled into the pickup system as a measure of applied angular rotation and applied acceleration. The coupling of energy into the pickup caused by linear acceleration is orthogonal to the coupling of energy caused by angular rotation rate, and the effects of the two sources of coupled energy can be separated by the system circuitry such that independent determination of the two types of input motion is realized. The sensing system is preferably made of a material such as crystalline quartz that is mechanically stable and is also piezoelectric so that the driving and sensing can be accomplished by piezoelectric techniques.

10 Claims, 15 Drawing Sheets

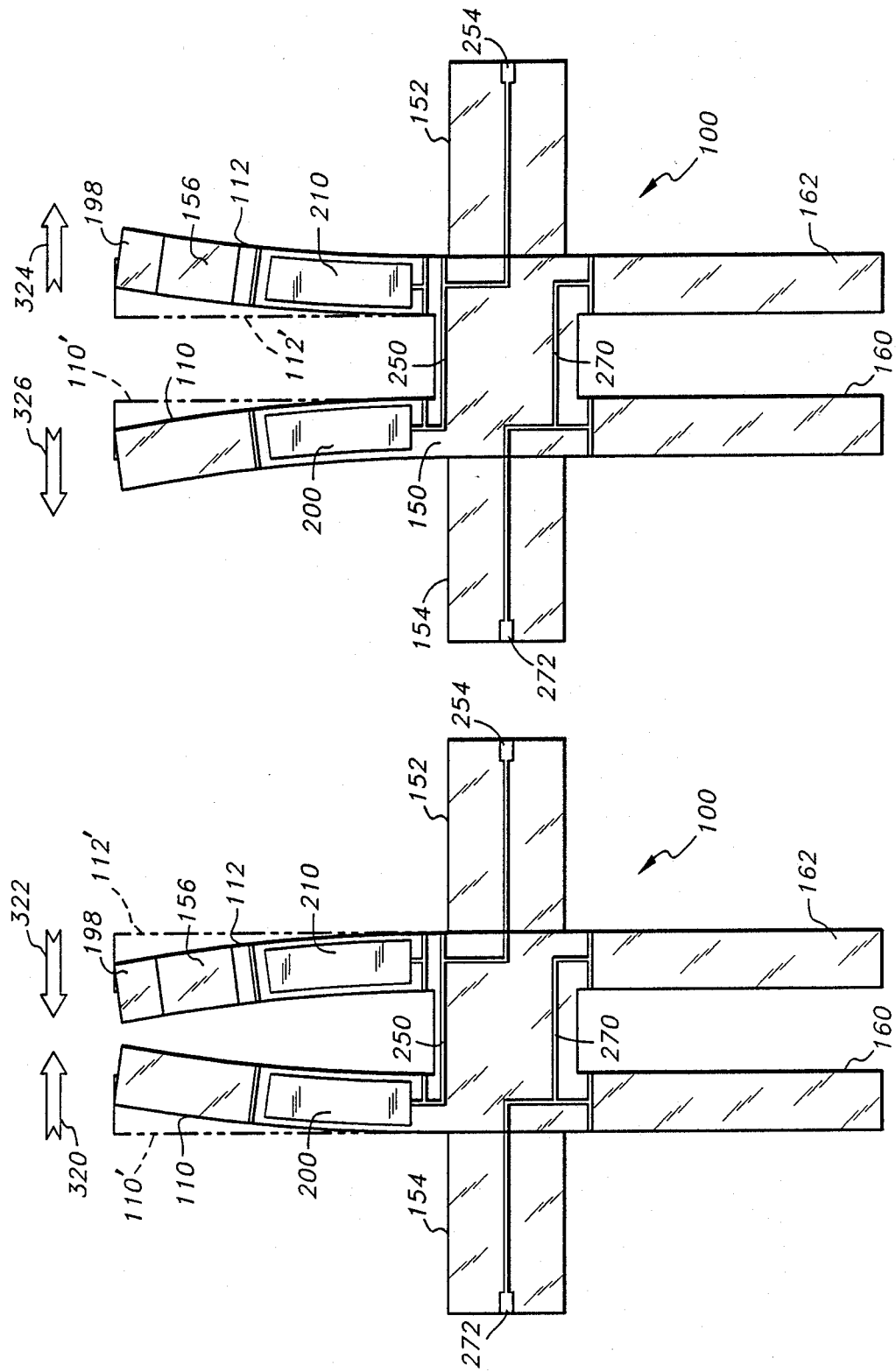

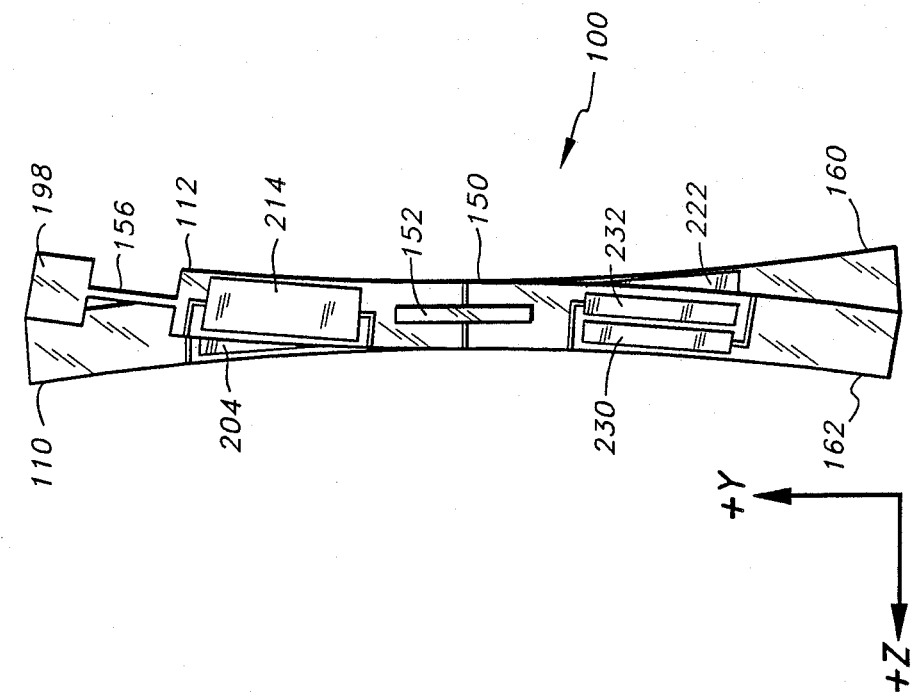
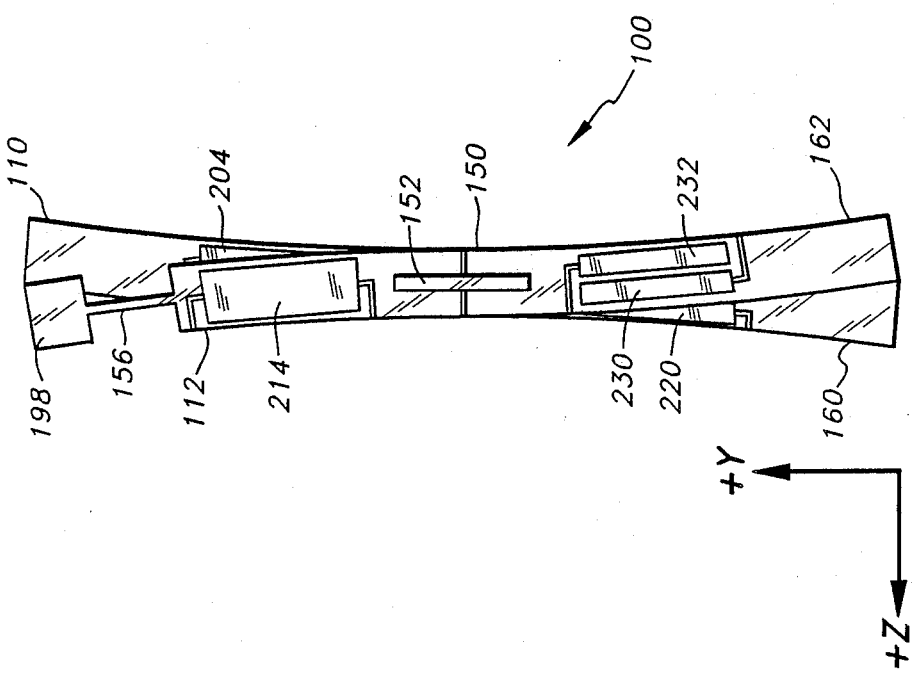

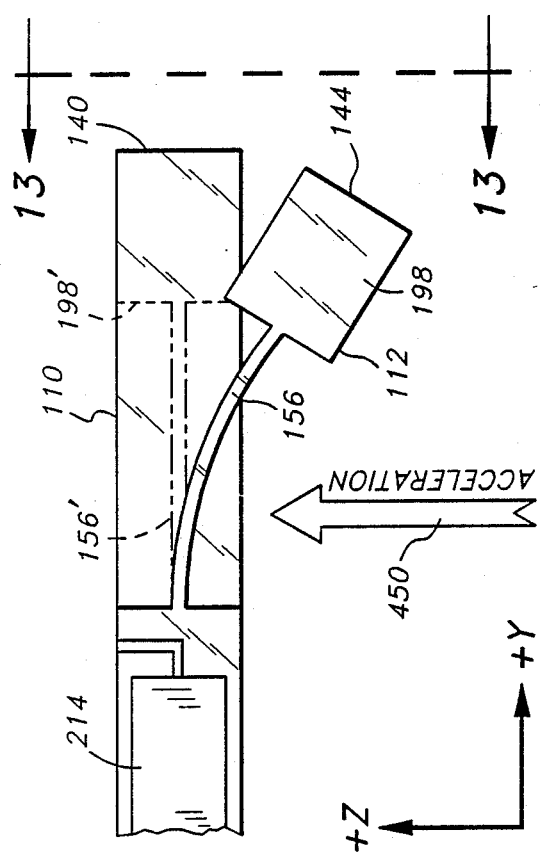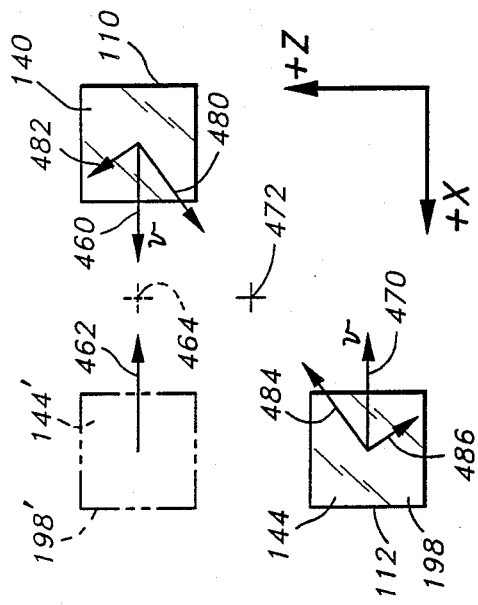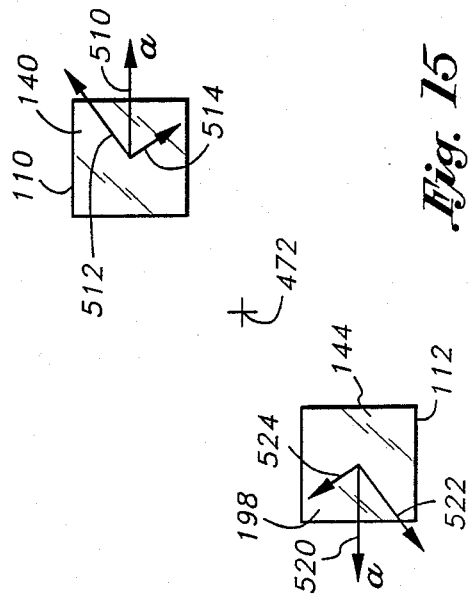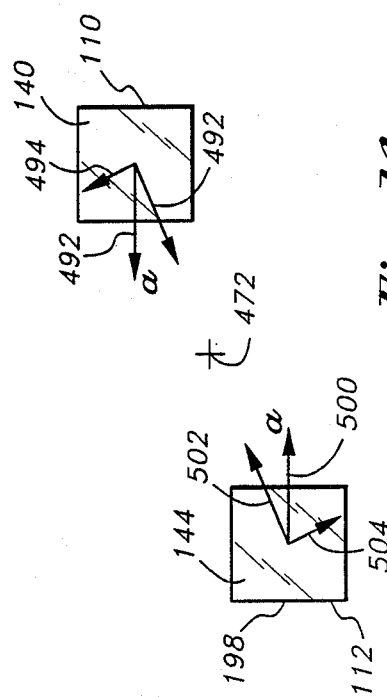

VIBRATORY LINEAR ACCELERATION AND ANGULAR RATE SENSING SYSTEM

BACKGROUND OF THE INVENTION

1. Field of the Invention

The present invention is in the field of motion sensors, and in particular, in the field of rotation sensors and accelerometers. More particularly, the present invention is in the field of rotation sensors and accelerometers that sense electronic signals generated by a vibrating mass to detect rotation and acceleration.

2. Background Information

Locating a moving transportation device with respect to a coordinate system has been a challenge for thousands of years. The use of a compass in combination with solar or stellar readings for ships and aircraft has been replaced with inertial navigation in which the current position of a ship, aircraft or spacecraft is determined by calculations based upon acceleration and changes of direction. In order to provide the accuracy needed to correctly locate and guide a fast moving aircraft or spacecraft or to locate a submarine that is submerged and has no visual references, a highly accurate inertial navigation and guidance system is required. The need for such inertial navigation and guidance systems is well known. Typically, the inertial navigation and guidance systems include a spinning mass gyroscope or other large and heavy system for sensing the changes in direction of the transportation device on which it is mounted. Similarly, known accelerometers for providing accurate indications of the acceleration of the transportation device are also large and heavy. Furthermore, such known inertial navigation devices are susceptible to damage or becoming uncalibrated as a result of shock and vibration generated by the transportation device. Finally, such known inertial navigation devices are expensive.

In U.S. Pat. Nos. 4,524,619, 4,538,461 and 4,654,663, rotation sensors embodying vibrating masses formed from single crystals of quartz or other suitable materials are described. The rotation sensors described in those patents have the advantages of being small, lightweight, shock resistant and relatively inexpensive compared to previously known devices. Thus far, no accelerometer having comparable features has been available. Virtually all linear accelerometers in use are based on the application of a force resulting from the acceleration of a proof mass within a housing. The housing is in turn mounted to the transportation device or other object that is to be accelerated. The externally applied force that accelerates the housing of the sensor must be transmitted through some connection to the proof mass inside. In some known accelerometers, the acceleration force deflects the mass against a spring connection to the housing and the strain in the spring is detected in an open-loop manner to thereby determine the acceleration. For example, the acceleration may be determined by measuring the distance that the proof mass moves against the spring. In other known accelerometers, a closed-loop system is provided in which the deflection of the spring is counteracted by a complementary restoring force to null the deflection. For example, the complementary restoring force may be an electromagnet acting against the proof mass, or the like. The amount of force required to null the deflection is measured to provide an indication of the acceleration.

In some open-loop implementations, an incidental oscillating system in the form of a bulk or surface acoustic wave oscillator may form the spring such that a frequency shift of the oscillator is an indication of the strain in the spring.

The disadvantages of commonly used accelerometers are common to those of previously known rotation sensors in that the systems are typically large, heavy and expensive, and are subject to failure caused by shock.

SUMMARY OF THE INVENTION

The present invention is unique in that the proof mass itself is part of an oscillating system that is caused to vibrate in a first vibratory mode. The deflection of the structure resulting from input acceleration causes coupling from the first vibratory mode to a second vibratory mode. The preferred embodiment of the sensor has a structure that is similar to the structure disclosed in the above-referenced U.S. Pat. Ser. No. 4,524,619. By modifying this structure described in the referenced patent, the vibrating mass is caused to exhibit an unbalance under acceleration without inhibiting the operation of the structure as an angular rate sensor. Thus, in certain embodiments of the present invention, both types of inertial motion may be sensed simultaneously and independently.

The present invention comprises a geometric implementation of a multiply resonant, monolithic, quartz crystalline structure that has optimized electrode patterns for piezoelectrically generating a reference vibratory motion and for piezoelectrically sensing a strain caused by the interactive effects of external inertial motions. The reference vibratory motion is accomplished by providing mass in each of two flexural tines. Drive electrodes are deposited on the two tines. The system comprising the tines naturally resonate in the common plane of the tines at a frequency determined by the tine inertia and the stiffness of the tines. External circuitry excites the electrodes on the tines with voltages that oscillate at the resonant frequency of the tine system. The piezoelectric effect of the applied voltage results in a mechanical strain of the tines that causes them to bend in a common plane referred to as the drive motion plane. The polarities of the voltages applied to the electrodes are selected to cause the pair of tines to resonate in mechanical opposition, resulting in a nominal cancellation of the equal and opposite linear momentum of the tines. Each of the reciprocating tines has a sinusoidal deflection or flexure in the common drive motion plane, a cosinusoidal velocity, and a sinusoidal acceleration of phase opposite to the deflection.

An acceleration input axis is defined as being perpendicular to the drive motion plane of the tines and perpendicular to the reference motion of the tines caused by the applied oscillating voltages. When the tines are accelerated in an input direction (i.e., in a direction along the input axis), the tines have a minute deflection in the input direction. Thus, the minute deflection is perpendicular to the drive deflection.

In the present invention, one of the two tines is fabricated to be less stiff in the input direction than the other without disturbing the drive balance between them. Under input acceleration, the weaker tine will deflect minutely more than the other, thereby coming out of the drive motion plane. The drive motion of the tines will not be exactly in mutual opposition. Rather, lines extending in the direction of movement of the two tines will be offset from each other. The motion of each tine can be resolved in a plane perpendicular to the tines as having a large component radial from the center between the tines, and a small component tangential at the nominal radius of the tine from the center. This tangential component of motion has a tangential acceleration such that the two tines produce a torque couple that tends to rotate the whole tine structure in a reciprocating manner synchronously with the drive motion.

The sensor structure extends beyond the drive portion of the tines in a geometry that exhibits a torsionally resonant mode of vibration that is excited by the above torque couple. The combination of drive reference acceleration and externally applied linear acceleration is required to excite this mode. Electrodes are optimally disposed along this extended portion of the structure to pick up electrical charges piezoelectrically generated on the surfaces strained by vibration in the pickup mode.

The drive tines are attached to each other and to the extended pickup structure such that a nominal node of the drive mode of vibration and also of the pickup mode are coincident. In other words, at this node, no detectable vibration resulting from the drive electrodes occurs. The node is advantageously used for the attachment of bridges to the mounting case so that maximum isolation between the vibratory motions and the outside world is accomplished.

Two additional embodiments of the invention are disclosed. One embodiment includes a pair of masses which, when subjected to linear acceleration, cause a pair of drive tines to be deflected out of a common drive plane and into separate drive planes. Thus, the drive tines no longer vibrate along collinear paths. The vibration of the drive tines in separate drive planes causes induced deflections in the sensing tines which cause an oscillating voltage that can be detected and demodulated to determine the magnitude and direction of the linear acceleration.

In a second alternative embodiment, one of a pair of drive tines includes a mass that includes an end mass that is deflected out of a common drive plane when linear acceleration is applied perpendicular to the drive plane. An imbalance in the two drive tines causes energy to be coupled to a common shaft which twists in a vibrating motion because of the coupled energy. The twisting motion of the common shaft induces a piezoelectric voltage which can be sensed and demodulated to determine the magnitude and direction of the applied acceleration.

As will be described more fully below, the present invention is a system for sensing acceleration that includes a first set of vibrating elements that vibrate in a balanced mode in a first plane in the absence of acceleration. The invention includes means for causing at least one element of the first set of vibrating elements to vibrate in a second plane, thereby causing the first set of elements to vibrate in an unbalanced mode. The invention further includes sensing means, such as, for example, a second set of vibrating elements or a common shaft coupled to the first set of vibrating elements. Means are provide for coupling energy from the first set of vibrating elements to the sensing means when the first set of vibrating elements vibrates in the unbalanced mode. Means are included for detecting the energy coupled to the sensing means and for providing an output signal responsive to the input acceleration.

The novel features that are characteristic of this invention are set forth in the appended claims. The invention will be best understood with reference to the accompanying drawings.

BRIEF DESCRIPTION OF THE DRAWINGS

FIG. 7 is a plan view of the crystal structure of the present invention showing the flexure of the drive tines toward each other in the XY plane caused by application of the drive voltage with the polarity corresponding to FIG. 3.

FIG. 8 is a plan view of the crystal structure of the present invention showing the flexure of the drive tines away from each other in the XY plane caused by application of the drive voltage with the polarity corresponding to FIG. 4.

FIG. 10 is an elevation view of the crystal structure of the present invention showing the flexure of the drive tines and the sensing tines in the YZ plane caused by coupling of the energy from the drive tines to the sensing tines and corresponding to the cross sectional view of the sensing tines in FIG. 6.

FIG. 11 is an elevation view of the crystal structure of the present invention showing the flexure of the drive tines and the sensing tines in the YZ plane caused by coupling of the energy from the drive tines to the sensing tines and corresponding to the cross sectional view of the sensing tines in FIG. 5.

FIG. 13 illustrates an end view of the two drive tines, taken in the direction of the arrows 13—13 in FIG. 12, showing the deflection of the end mass caused by input acceleration, and further showing the resolution of the peak drive velocity into radial and tangential vector components.

FIG. 14 illustrates an end view of the two drive tines, taken in the direction of the arrows 13—13 in FIG. 12, showing the deflection of the end mass caused by input acceleration, and further showing the resolution of the peak drive acceleration at maximum deflection in the X plane into radial and tangential vector components.

FIG. 15 illustrates an end view of the two drive tines, taken in the direction of the arrows 13—13 in FIG. 12, showing the deflection of the end mass caused by input acceleration, and further showing the resolution of the peak drive acceleration at minimum deflection in the X plane into radial and tangential vector components.

FIG. 17 is a perspective view of an alternative embodiment of the present invention which includes additional masses connected to the bridge portions to cause the tines to vibrate out of the normal drive plane.

DETAILED DESCRIPTION OF THE PREFERRED EMBODIMENT

DESCRIPTION OF THE STRUCTURE

Figure 1:
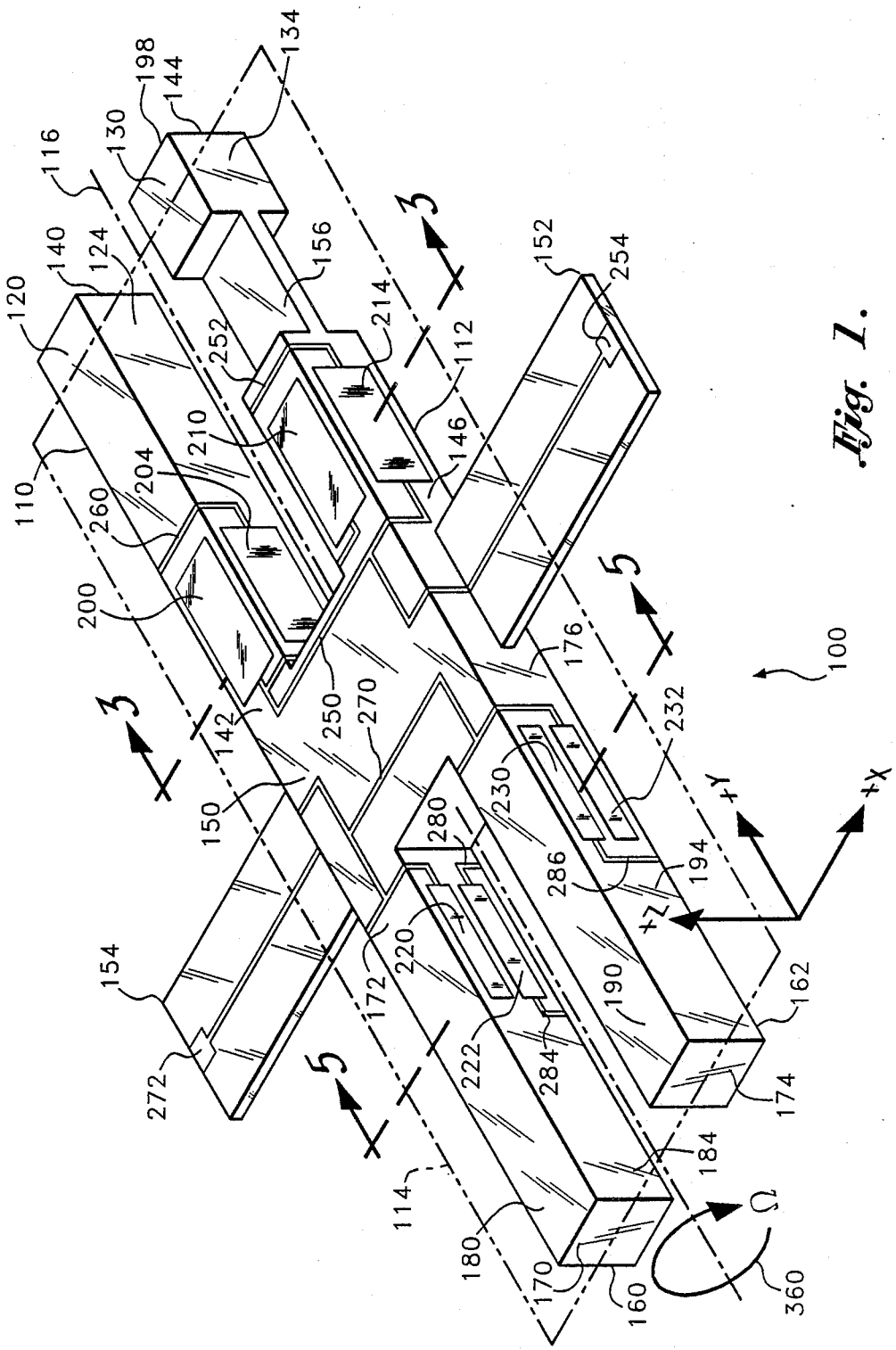
FIG. 1 is a perspective view of the preferred embodiment of the present invention showing the H-shaped configuration of sensor, and further showing the positions of the electrodes on the drive and pickup tines.
Figure 2:
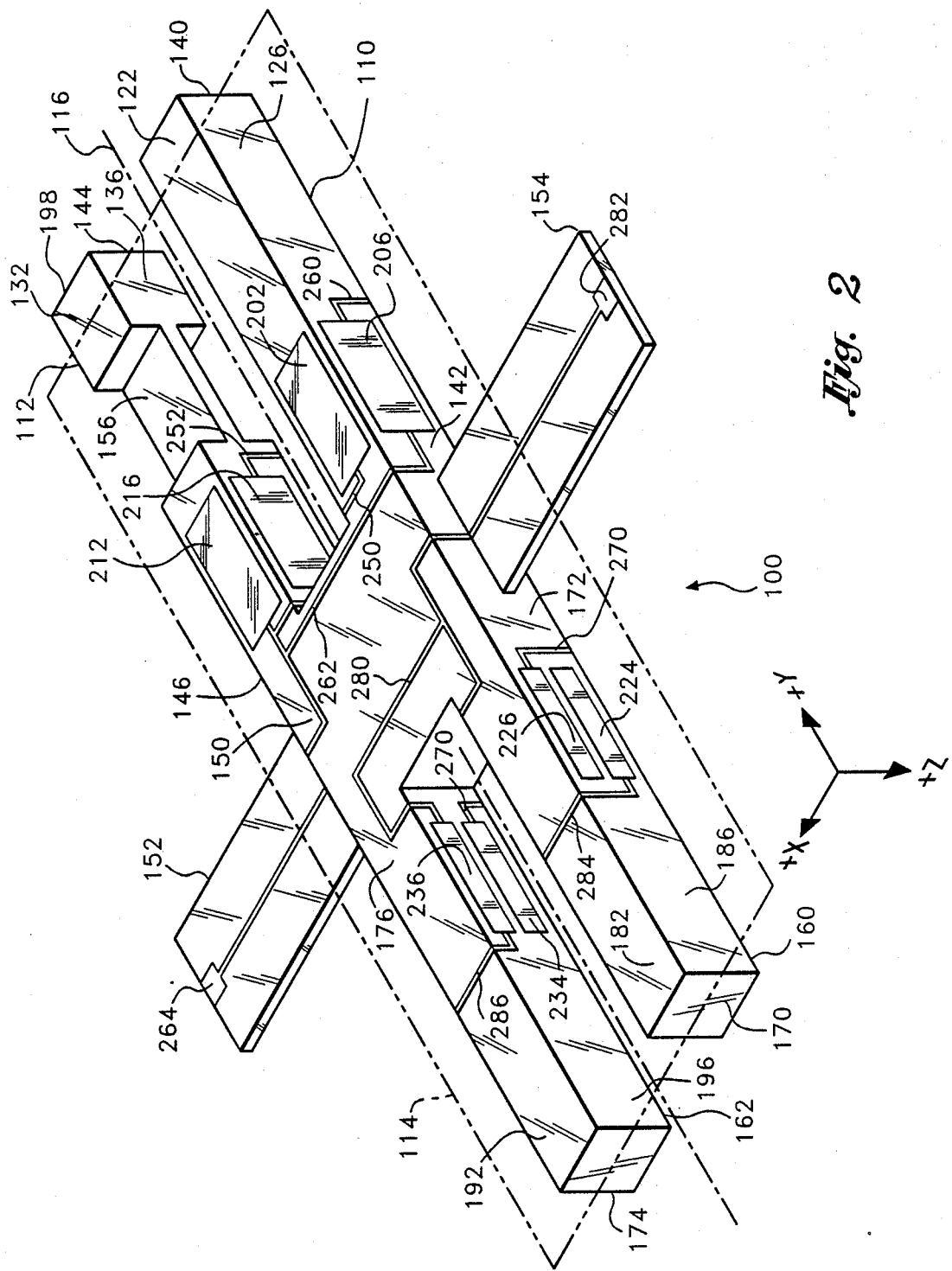
FIG. 2 is a perspective view of the preferred embodiment of FIG. 1 rotated by 180 degrees with respect to the Y axis of symmetry showing the positions of the electrodes on the surfaces of the sensor that are hidden in FIG. 1.

FIGS. 1 and 2 are perspective views of the preferred embodiment of the sensor comprising a single crystal 100 of quartz or other suitable material. Customarily, an orthogonal set of axes is chosen for a quartz crystal aligned in a particular way with the trigonal structure of the crystal molecular lattice. These axes are identified as X, Y, and Z in FIG. 1.

The single crystal 100 is configured as a first drive tine 110 and a second drive tine 112 which extend in the +Y direction. Each of the two drive tines 110, 112 has a rectangular cross section in a plane defined by the XZ axes of the crystal. As illustrated, the two drive tines 110, 112 are each symmetrical about a first plane 114 (shown in phantom) defined by the Y and Z axes of the crystal 100. The two drive tines 110, 112 are disposed parallel to each other and extend in the direction of the Y axis. For reference hereinafter, a Y axis of symmetry 116 is shown in phantom. As illustrated, the first drive tine 110 and the second drive tine 112 are spaced apart by an equal distance from the Y axis of symmetry 116.

The first drive tine 110 has a first surface 120 and a second surface 122, parallel the first surface 120. The first surface 120 and the second surface 122 are each parallel to the first plane 114. The first drive tine 110 has a third surface 124 and a parallel fourth surface 126. The third surface 124 and the fourth surface 126 lie in planes perpendicular to the first plane 114.

In like manner, the second drive tine 112 has a first surface 130 and a parallel second surface 132, which are each parallel to the first plane 114. The second drive tine 112 has a third surface 134 and a parallel fourth surface 136, each of which is perpendicular to the first plane 114.

The first drive tine has a free first end 140 and a second end 142. The second drive tine has a free first end 144 and a second end 146. The second end 142 of the first drive tine 110 and the second end 146 of the second drive tine 112 are each connected to a body portion 150 of the single crystal 100, which, as illustrated in FIG. 1, is symmetrical about the first plane 114 (i.e., in the XY plane of the crystal 100) and is disposed in the direction of the X axis of the crystal between the two second ends 142, 146 of the first and second drive tines 110, 112. The body portion 150 serves as a common base for the first and second drive tines 110 and 112. The body portion 150 is connected to a first bridge portion 152 and a second bridge portion 154 which lie in the first plane 114 and extend in opposite directions from the body portion 150 in the X direction of the crystal 100. The first and second bridge portions 152, 154 are connectable to an external mounting structure (not shown) to provide a mechanical connection of the crystal 100 to the device which is to be accelerated. For example, the mounting structure can be the casing of an accelerometer module which can be mounted in an aircraft, or the like.

As illustrated in FIGS. 1 and 2, the first drive tine 110 has a substantially uniform cross section from the free first end 140 to the second end 142. In contrast, the second drive tine 112 has a cross section substantially equal to the cross section of the first drive tine 110 proximate to the free first end 144 and proximate to the second end 146. However, a thin portion 156 of the second drive tine 112 has a reduced cross section. In the embodiment shown, the thin portion 156 is located such that it is closer to the free first end 144 of the second drive tine 112 than it is to the second end 146. Also, as shown in FIGS. 1 and 2, the cross section of the thin portion 156 is reduced in the Z-direction of the crystal only, with the dimension of the thin portion 156 in the X-direction being substantially equal to the dimension of the free first end 144 and the dimension of the second end 146 of the second drive tine 112 in the X-direction. The thin portion 156 comprises a region of increased flexibility of the second drive tine 112 and provides the unique operational characteristics of the present invention that enables it to sense acceleration.

A first sensing tine 160 and a second sensing tine 162 extend from the body portion 150 in opposite directions from the first drive tine 110 and the second drive tine 112 (i.e., they extend in the −Y direction of the single crystal). As illustrated, the first sensing tine 160 and the second sensing tine 162 each has a rectangular cross section and they each are symmetrical with respect to the first plane 114. In addition, the first sensing tine 160 and the second sensing tine 162 are spaced apart by equal distances from the Y axis of symmetry 116.

The first sensing tine 160 has a free first end 170 and a second end 172. The second end 172 of the first sensing tine 160 is connected to the body portion 150. Similarly, the second sensing tine 162 has a free first end 174 and a second end 176. The second end 176 of the second sensing tine 162 is connected to the body portion 150.

The first sensing tine 160 has a first surface 180 and a second surface 182, parallel the first surface 180. The first surface 180 and the second surface 182 of the first sensing tine 160 are each parallel to the first plane 114. The first sensing tine 160 has a third surface 184 and a parallel fourth surface 186. The third surface 184 and the fourth surface 186 lie in planes perpendicular to the first plane 114. In like manner, the second sensing tine 162 has a first surface 190 and a parallel second surface 192, which are each parallel to the first plane 114. The second sensing tine 162 has a third surface 194 and a parallel fourth surface 196, each of which is perpendicular to the first plane 114.

The first drive tine 110, the second drive tine 112, the first sensing tine 160, the second sensing tine 162, the body portion 150, the first bridge portion 152 and the second bridge portion 154 are preferably fabricated from a single Z-plate quartz wafer by chemical milling or another suitable process which provides precise control over the removal of portions of the quartz crystal. The thin portion 156 of the second drive tine 112 is fabricated by removing additional portions of the quartz crystal 100 from the first surface 130 and the second surface 132 of the second drive tine 112. This removal is also advantageously accomplished by chemical milling, or the like.

As a specific example of an exemplary embodiment of the present invention, the first and second drive tines 110 and 112 and the first and second sensing tines 160 and 162 have cross-sectional dimensions of approximately 0.02 inches (0.5 millimeters) by 0.02 inches, and have lengths of approximately 0.200 inches (5 millimeters) from their respective free first ends to their respective second ends. The first and second drive tines 110 and 112 are spaced apart by approximately 0.04 inches (1 millimeter), center-to-center. The first and second sensing tines 160 and 162 advantageously have similar sizes and spacing.

In the exemplary embodiment, the thin portion 156 is formed on the second drive tine 112 by removing the crystal from the first and second surfaces 130 and 132 for a length of approximately 0.05 inches (1.3 millimeters) starting approximately 0.025 inches (0.64 millimeters) from the free second end 140. Thus, an end portion or end mass 198, having the full cross-sectional dimensions of the second drive tine 112, is defined between the thin portion 156 and the free second end 140. The crystal is removed to a depth such that the thickness of the thin portion 156 that remains is approximately 0.003 inch (0.08 millimeters). The purpose of the thin portion 156 and the end mass 198 will be described below in connection with the description of the operation of the present invention.

The first drive tine 110 has a first drive electrode 200 disposed on the first surface 120 and a second drive electrode 202 disposed on the second surface 122. The first drive tine 110 further has a third drive electrode 204 disposed on the third surface 124 and a fourth drive electrode 206 disposed on the fourth surface 126. In like manner, the second drive tine 112 has a fifth drive electrode 210 disposed on the first surface 130, a sixth drive electrode 212 disposed on the second surface 132, a seventh drive electrode 214 disposed on the third surface 134, and an eighth drive electrode 216 disposed on the fourth surface 136. The first drive electrode 200, the second drive electrode 202, the fifth drive electrode 210 and the sixth drive electrode 212 are disposed parallel to the first plane 114. The third drive electrode 204, the fourth drive electrode 206, the seventh drive electrode 214 and the eighth drive electrode 216 are disposed perpendicular to the first plane 114.

The first sensing tine 160 has a first sensing electrode 220 and a second sensing electrode 222 disposed on the third surface 184. The first sensing electrode 220 and the second sensing electrode 222 of the first sensing tine 160 are spaced apart from each other in the Z direction and extend in the Y direction along the third surface 184 of the first sensing tine 160. The first sensing tine 160 has a third sensing electrode 224 and a fourth sensing electrode 226 disposed on the fourth surface 186. The third sensing electrode 224 and the fourth sensing electrode 226 are spaced apart from each other in the Z direction and extend in the Y direction along the fourth surface 186 of the first sensing tine 160. Thus, the third sensing electrode 224 and the fourth sensing electrode 226 are parallel to the first sensing electrode 220 and the second sensing electrode 222. The first sensing electrodes 220, the second sensing electrode 222, the third sensing electrode 224 and the fourth sensing electrode 226 each lie in planes perpendicular to the first plane 114.

The second sensing tine 162 has a fifth sensing electrode 230 and a sixth sensing electrode 232 disposed on the third surface 194. The fifth sensing electrode 230 and the sixth sensing electrode 232 of the second sensing tine 162 are spaced apart from each other in the Z direction and extend in the Y direction along the third surface 194 of the second sensing tine 162. The second sensing tine 162 has a seventh sensing electrode 234 and a eighth sensing electrode 236 disposed on the fourth surface 196. The seventh sensing electrode 234 and the eighth sensing electrode 236 are spaced apart from each other in the Z direction and extend in the Y direction along the fourth surface 196 of the second sensing tine 162. The seventh sensing electrode 234 and the eighth sensing electrode 236 are parallel to the fifth sensing electrode 230 and the sixth sensing electrode 232. Thus, the fifth sensing electrode 230, the sixth sensing electrode 232, the seventh sensing electrode 234 and the eighth sensing electrode 236 are perpendicular to the first plane 114 and are parallel to the first, second, third and fourth sensing electrodes 220, 222, 224 and 226.

The driving and sensing electrodes described above are preferably formed on the respective surfaces of the tines of the crystal 100 by vapor deposition of thin gold film on the surfaces. Preferably, portions of the gold film are selectively removed by using etch masks that are applied to the tine surfaces using conventional photolithographic techniques. In addition, in the preferred embodiment, the electrodes on the surfaces in the YZ planes are formed by vapor deposition of gold through the opening of an appropriately configured aperture mask. Each of the electrodes is electrically connected to a respective circuit path formed on the surfaces of the crystal 100 by the above-described vapor deposition techniques.

Although not shown herein, in preferred embodiments of the present invention, the above-described vapor deposition techniques are also used to deposit additional films of gold on the surfaces of the first and second drive tines 110 and 112 and the first and second sensing tines 160 and 162 proximate to the respective free ends of the tines. The addition mass of the deposited gold increases the vibratory moments of the tines to enhance the vibratory operation of the structure 100. Furthermore, the deposited gold on each of the tines can be trimmed by conventional methods (e.g., laser trimming or the like) to balance the tines with respect to each other.

In the illustrated embodiment, a first circuit path 250 provides an electrical interconnection between the first drive electrode 200, the second drive electrode 202 and the eighth drive electrode 214. The eighth drive electrode 216 is electrically connected to the seventh drive electrode 214 via a second circuit path 252. Thus, the first, second, seventh and eighth drive electrodes 200, 202, 214 and 216 are electrically connected together. The first circuit path 250 extends onto the second bridge portion 152 of the body portion 150 and provides an electrical connection to a first bonding pad 254. The first bonding pad 254 is connectable to an external electrical circuit (not shown) to provide an electrical interconnection between the external electrical circuit and the first, second, seventh and eighth drive electrodes 200, 202, 214 and 216.

A third circuit path 260 provides an electrical interconnection between the third drive electrode 204 and the fourth drive electrode 206. A fourth circuit path 262 provides an electrical interconnection between the fourth drive electrode 206, the fifth drive electrode 210 and the sixth drive electrode 212. Thus, the third, fourth, fifth and sixth drive electrodes 204, 206, 210 and 212 are electrically interconnected. The fourth circuit path 262 extends onto the second bridge portion 152 of the body portion 150 and provides an electrical connection to a second bonding pad 264. The second bonding pad 264 is connectable to the external electrical circuit (not shown) to provide an electrical interconnection between the external electrical circuit and the third, fourth, fifth and sixth drive electrodes 204, 206, 210 and 212.

A fifth circuit path 270 provides an electrical interconnection between the first sensing electrode 220, the fourth sensing electrode 226, the sixth sensing electrode 232 and the seventh sensing electrode 234. The fifth circuit path 270 extends onto the second bridge portion 154 of the body portion 150 and provides an electrical connection to a third bonding pad 272 (FIG. 1). The third bonding pad 272 is connectable to an external electrical circuit (not shown) to provide an electrical interconnection between the external electrical circuit and the first, fourth, sixth and seventh sensing electrodes 220, 226, 232 and 234.

A sixth circuit path 280 provides an electrical interconnection between the second sensing electrode 222 and the eighth sensing electrode 236. The sixth circuit path 280 extends onto the second bridge portion 154 of the body portion 150 and provides an electrical connection to a fourth bonding pad 282 (FIG. 2). A seventh circuit path 284 interconnects the second sensing electrode 222 and the third sensing electrode 224. An eighth circuit path 286 interconnects the eighth sensing electrode 236 and the fifth sensing electrode 230. The fourth bonding pad 282 is connectable to the external electrical circuit (not shown) to provide an electrical interconnection between the external electrical circuit and the second, third, fifth and eighth sensing electrodes 222, 224, 230 and 236.

In the embodiment described above, the electrical interconnections between the electrodes are provided on the surfaces of the crystal 100. In alternative embodiments (not shown), each of the electrodes can be provided with an individual circuit path which extends onto one of the first and second bridge portions 152, 154. In such an embodiment, the interconnections between the drive electrodes and the interconnections between the sensing electrodes can be provided by external connections.

Description of the Operation of a Crystal Tuning Fork Rotation Sensor

The theory of operation of the present invention will first be explained in terms of the operation of the device when the structure in which it is mounted is in a stable non-accelerating, non-rotating state. In other words, the initial description is applicable when the vehicle or other device in which the present invention is mounted is immobile or is moving in a straight line at a constant velocity.

Figure 3:
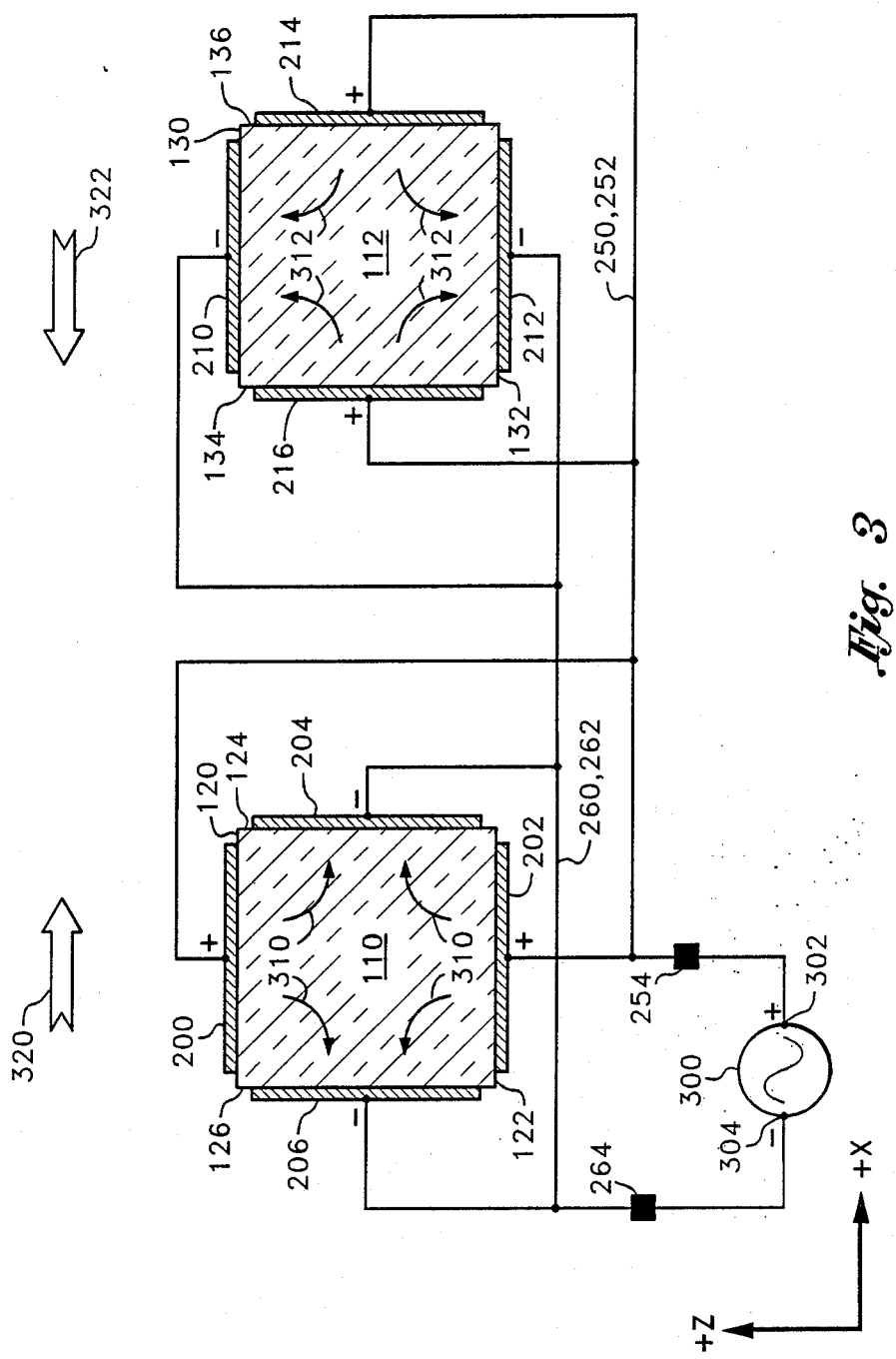
FIG. 3 is a cross section of the drive tines showing the electrode pattern and circuit polarities, and further showing the voltage gradients induced in the crystal structure for a first voltage polarity applied to the electrodes to cause flexures (i.e., deflections) of the drive tines in respective first directions.
Figure 4:
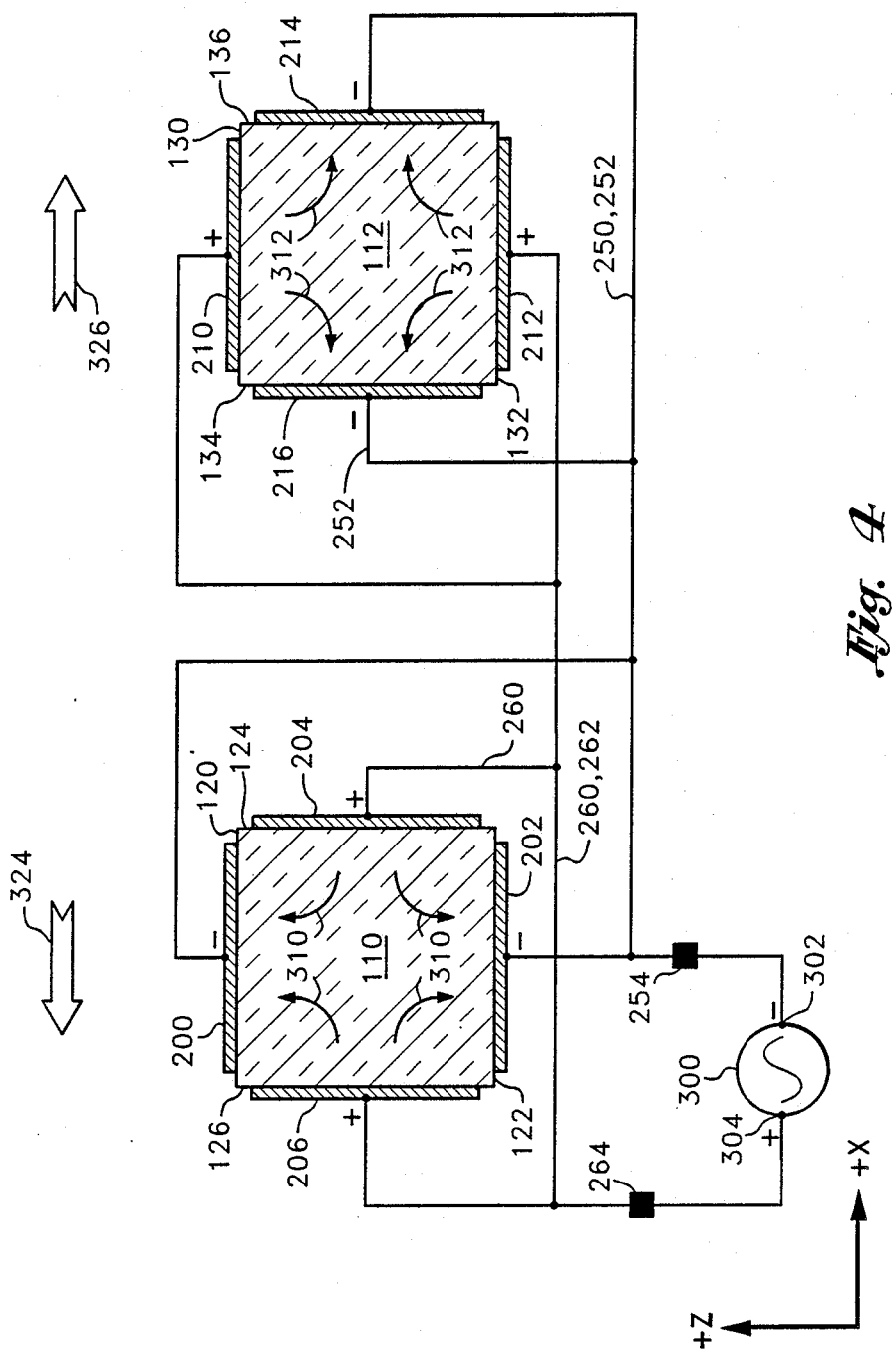
FIG. 4 is a cross section of the drive tines similar to FIG. 3, further showing the voltage gradients induced in the crystal structure for a second voltage polarity applied to the electrodes to cause flexures of the drive tines in respective second directions.

FIGS. 3 and 4 are cross-sectional views of the first drive tine 110 and the second drive tine 112 taken through the drive electrodes along the line 3—3 in FIG. 1. The drive electrodes, comprising the thin, gold film, are shown with exaggerated cross sections in FIGS. 3 and 4. FIGS. 3 and 4 further illustrate a schematic representation of the electrical interconnections to the drive electrodes. As illustrated, on each of the drive tines 110, 112, the drive electrodes on opposite parallel surfaces are electrically interconnected. Thus, on the first drive tine 110, the first drive electrode 200 is electrically connected to the second drive electrode 202, and the third drive electrode 204 is electrically connected to the fourth drive electrode 206. Similarly, on the second drive tine 112, the fifth drive electrode 210 is electrically connected to the sixth drive electrode 212, and the seventh drive electrode 214 is electrically connected to the eighth drive electrode 216. As further illustrated, the first drive electrode 200 and the second drive electrode 202 of the first drive tine 110 are electrically connected to the seventh drive electrode 214 and the eighth drive electrode 216 of the second drive tine 112. In like manner, the third drive electrode 204 and the fourth drive electrode of the first drive tine 110 are electrically connected to the fifth drive electrode 210 and the sixth drive electrode 212 of the second drive tine 112. Thus, it can be seen that the drive electrodes in XY planes of one drive tine are electrically cross-coupled with the mutually perpendicular drive electrodes in YZ planes of the other drive tine.

The external drive circuitry for the present invention will be described below. However, for the present discussion, the external drive circuitry is illustrated in FIGS. 3 and 4 as a simple oscillator 300 having first and second output terminals 302 and 304. The oscillator 300 generates an oscillating voltage between the first and second output terminals 302, 304. For example, during first half cycles of the oscillating voltage, the voltage on the first output terminal 302 is positive with respect to the voltage on the second output terminal 304, as illustrated in FIG. 3; and, during second half cycles, the voltage on the first output terminal 302 is negative with respect to the voltage on the second output terminal 304, as illustrated in FIG. 4. The first output terminal 302 of the oscillator 300 is electrically connected to the first, second, seventh and eighth drive electrodes 200, 202, 214 and 216. The second output terminal 304 of the oscillator 300 is electrically connected to the third, fourth, fifth and sixth drive electrodes 204, 206, 210 and 212. Thus, the voltage generated by the oscillator 300 are applied to the drive electrodes to provide the voltage polarities illustrated in FIGS. 3 and 4.

In FIG. 3, a positive voltage is applied to the first, second, seventh and eighth drive electrodes 200, 202, 214 and 216 and a negative voltage is applied to the third, fourth, fifth and sixth drive electrodes 204, 206, 210 and 212. In FIG. 4, a negative voltage is applied to the first, second, seventh and eighth drive electrodes 200, 202, 214 and 216 and a positive voltage is applied to the third, fourth, fifth and sixth drive electrodes 204, 206, 210 and 212.

The voltages applied to the electrodes produce electric field gradients in the X and Z directions inside the two drive tines, as illustrated by a first set of arrows 310 in the first drive tine 110 and a second set of arrows 312 in the second drive tine 112. As illustrated in FIG. 3, within each of the two drive tines 110, 112, there is an electric field gradient from each electrode having a positive voltage to each of the mutually perpendicular electrodes having a negative voltage. Thus, when the voltages are reversed, as illustrated in FIG. 4, the direction of the electric field gradient reverses.

The voltage gradients applied between the electrodes of the two drive tines cause piezoelectric strains to be induced in the two tines. Each of the electric field gradients can be resolved into a component in the +Z or −Z direction and a component in the +X or −X direction. The electric field component in the Z direction of the crystal 100 has no piezoelectric effect. Thus, the only piezoelectric effect caused by the voltages applied to the drive electrodes is caused by the electric field component in the X direction. It can be seen that in FIG. 3, the electric field gradient in the first drive tine 110 has a component in the +X direction proximate to the third surface 124 and has a component in the −X direction proximate to the fourth surface 126.

As is well-known in the art, the direction of the piezoelectric strains induced in a Z-plate crystal depend upon the direction of the electric field gradient in the X direction. Since the electric field gradient in the +X direction for the portion of the first drive tine 110 proximate to the third surface 124 is in a different direction than the electric field gradient in the −X direction proximate to the fourth surface 126, the piezoelectric strain effect will be different for the two portions. This differential piezoelectric strain effect results in the extension in the Y direction of one of the third and fourth surfaces of the first drive tine 110 and in the compression of the other of the third and fourth surfaces. The differential extension and compression causes a flexure of the first drive tine 110 in the XY plane, as is well known in the art. Reversal of the applied voltage reverses the extension and compression.

It will be assumed for this discussion, that the molecular structure of the crystal 100 is such that an electric field gradient in the +X direction causes compression of the crystal in the Y direction and that an electric field gradient in the −X direction causes an extension of the crystal in the Y direction. Thus, the voltage polarities on the drive electrodes of the first drive tine 110 as illustrated in FIG. 3 will cause the portion of the crystal 100 proximate to the third surface 124 to compress and cause the portion of the crystal 100 proximate to the fourth surface 126 to extend. The differential compression and extension causes the first drive tine 110 to flex (i.e., deflect) in the direction of the compressed portion of the crystal 100. In other words, the first drive tine 110 will deflect in the +X direction, as indicated by a first directional arrow 320. Thus, the first drive tine 110 will deflect toward the second drive tine 112.

The second drive tine 112 is electrically connected so that the electric field gradients are in the opposite direction as the electric field gradients in the first drive tine 110. Thus, for the polarities illustrated in FIG. 3, the second drive tine 112 will deflect in the −X direction toward the first drive tine 110, as indicated by the second directional arrow 322.

In FIG. 4, the polarities of the voltages applied to the electrodes of the two drive tines 110, 112 are reversed with respect to the polarities in FIG. 3. Thus, the first drive tine 110 will deflect in the −X direction away from the second drive tine 112, as indicated by a third directional arrow 324. In like manner, the second drive tine 112 will deflect in the +X direction toward the first drive tine 110, as indicated by a fourth directional arrow 326. Thus, it can be seen that the cross electrical connection of the drive electrodes between the two drive tines 110, 112 causes them to flex either together or apart according to the polarity of the applied voltage. By continually reversing the polarities of the voltages applied to the drive electrodes, the two drive tines 110, 112 are caused to periodically flex towards and away from each other.

The foregoing is further illustrated in FIGS. 7 and 8 which are plan views of the crystal 100. FIG. 7 illustrates the two drive tines 110, 112 flexing towards each other, from respective rest positions (shown in phantom lines indicated by 110' and 112', respectively), when the polarities of the voltages applied to the drive electrodes are as illustrated in FIG. 3. FIG. 8 illustrates the two drive tines 110, 112 flexing away from each other, from the rest positions 110', 112', when the polarities of the voltages applied to the drive electrodes are as illustrated in FIG. 4.

The first and second drive tines 110, 112 of the crystal 100 have a natural mechanical resonance mode at a particular resonant frequency. When the oscillating voltage output of the oscillator 300 is adjusted to the resonant frequency, the crystal 100 acts as an electromechanical oscillator which vibrates at the resonant frequency. Electrically, the crystal 100 appears as a series resonant circuit requiring relatively little power input from the oscillator 300 to maintain the vibration at the resonant frequency.

It should be understood that the first and second drive tines 110, 112 are accelerated by the voltages applied to the drive electrodes. In the resonant operating mode, the first and second drive tines have a maximum velocity in either the +X direction or the −X direction as they pass through the respective rest positions 110', 112', and have minimum velocities as they switch directions when they reach their maximum deflections toward and away from each other. Thus, if the deflection is considered to be a sinusoidal function of time, the velocity will be a cosinusoidal function of time. The accelerations of the tines is also a sinusoidal function of time. The acceleration of a tine is a maximum when the deflection is a maximum and is a minimum as the tine passes through its rest position at maximum velocity. It can be seen that the acceleration is 180 degrees out of phase with the deflection. In other words, when the deflection is at the maximum in the +X direction, the acceleration will be a maximum in the −X direction in order to cause the tine to reverse directions from its previous movement.

Figure 9:
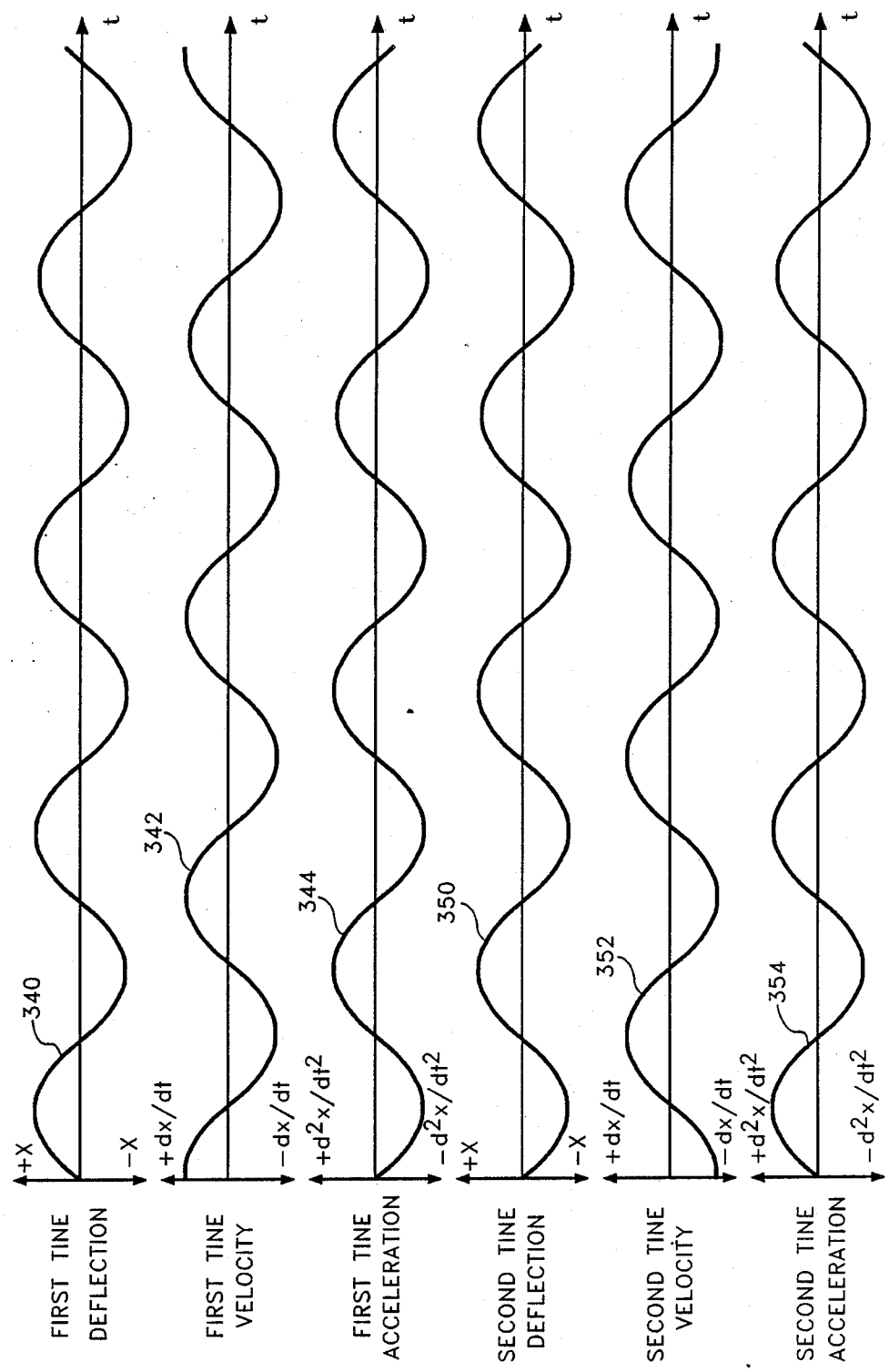
FIG. 9 illustrates graphs of the deflections (i.e., flexures), velocities and accelerations of the two drive tines as a function of time in response to an oscillating drive voltage.

The foregoing discussion of deflection, velocity and acceleration of the two drive tines 110, 112 is illustrated in FIG. 9. A sinusoidal curve 340 in FIG. 9 represents the deflection of the first drive tine 110 in either the +X or the −X direction as a function of time. A cosinusoidal curve 342 represents the velocity of the first drive tine 110, referenced to the +X direction, as a function of time. A sinusoidal curve 344 represents the acceleration of the first drive tine 110, referenced to the +X direction, as a function of time. Similarly, a sinusoidal curve 350 represents the deflection of the second drive tine 112, a cosinusoidal curve 352 represents the velocity of the second drive tine 112 and a sinusoidal curve 354 represents the acceleration of the second drive tine 112. The curves 350, 352 and 354 for the second drive tine 112 are 180 degrees out of phase with the corresponding curves 340, 342 and 344, respectively, for the first drive tine 110 since the second drive tine 112 is always moving in the opposite direction from the first drive tine 110.

One skilled in the art will appreciate that for the resonant crystal 100 having the structure described above, the drive voltage generated by the oscillator 300 and the current flowing to the crystal 100 will be in phase with the velocity when the crystal 100 is driven at its resonant frequency.

Operation of the Device as a Rotation Sensor

The first and second sensing tines 160, 162 are normally quiescent. That is, if the crystal 100 is stationary with respect to a coordinate system or is moving with uniform velocity in a straight line in that coordinate system, the first and second sensing tines 160, 162 do not move with respect to the body portion 150. However, if the crystal 100 is caused to rotate about an axis in the Y direction (i.e., the crystal 100 has a rotational velocity Ω as indicated by a circle 360 about the Y axis of sYmmetry in FIG. 2), the known Coriolis effect acting upon the first and second drive tines 110, 112 will cause tangential accelerations of the first and second drive tines 110, 112 as they deflect toward and away from each other. The tangential acceleration of each tine is in phase with its respective velocity. That is, the tangential accelerations in the Z directions have peaks when the velocity of the tines in the X directions have peaks. The tangential accelerations of the drive tines cause a time-varying torsion to be applied to the body portion 150. This time-varying torsion is coupled to the first and second sensing tines 160, 162 causing the sensing tines to vibrate.

Although discussed above with respect to rotation about the Y axis of symmetry 116, it should be understood that rotations about another axis having a component of the axis parallel to or collinear with the Y axis of symmetry will also cause the above-described effects.

The four tine crystal 100 constructed as illustrated in FIGS. 1 and 2 has a torsionally resonant mode of vibration which is excited by tangential accelerations of the two drive tines 110, 112. In this vibration mode, both the drive tines 110, 112 and the sensing tines are caused to deflect out of the XY plane 114. In other Words, the drive tines 110, 112 and the sensing tines 160, 162 deflect in Z directions as illustrated by the elevation views in FIGS. 10 and 11. It can be seen in FIG. 10 that when the first drive tine 110 deflects in the −Z direction, the second drive tine 112 deflects in the +Z direction, the first sensing tine 160 deflects in the +Z direction, and the second sensing tine 162 deflects in the −Z direction. Conversely, as illustrated in FIG. 11, when the first drive tine 110 deflects in the +Z direction, the second drive tine 112 deflects in the −Z direction, the first sensing tine 160 deflects in the −Z direction, and the second sensing tine 162 deflects in the +Z direction. The vibrations of the four tines in the Z directions counteract each other so that there is a node at the body portion 150 so that no vibration is coupled to the first bridge portion 152 or the second bridge portion 154. Thus, no vibrations from the tines are coupled to the external support structure (not shown), nor are the four tines affected by external vibrations.

Figure 5:
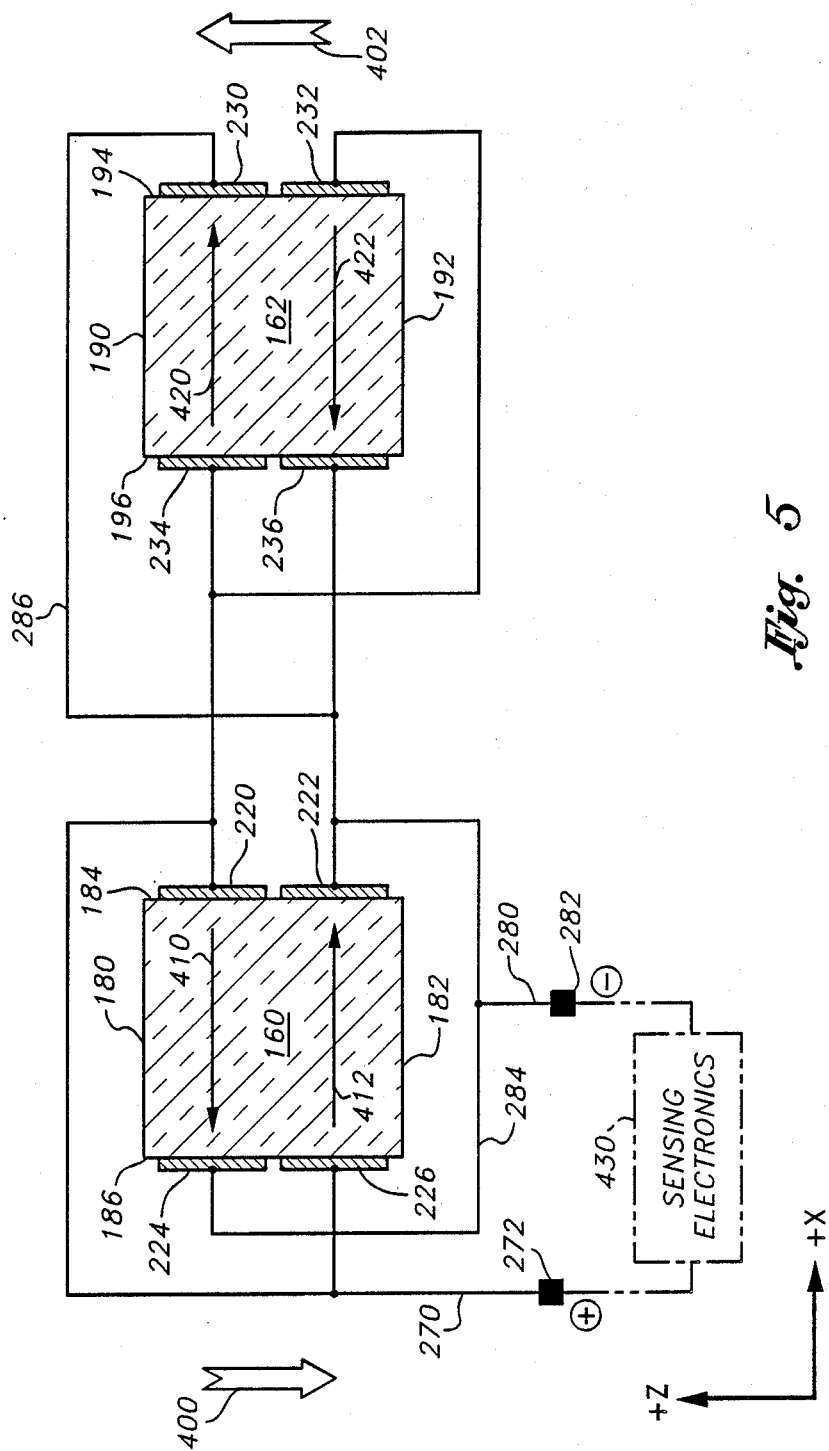
FIG. 5 is a cross section of the pickup tines showing the electrode pattern and the voltage gradients induced in the crystal structure caused by flexure in respective first directions, thus causing a voltage of a first polarity on the electrodes.

The deflections of the first and second sensing tines 160, 162 in the +Z and −Z directions cause the first and second surfaces of the two sensing tines to be alternately compressed and extended. In other words, when the first sensing tine 160 is deflected in the −Z direction, as illustrated by a fifth directional arrow 400, the first surface 180 is extended and the second surface 182 is compressed. At the same time, the second sensing tine 162 is deflected in the +Z direction, as illustrated by a sixth directional arrow 402, causing the first surface 190 to be compressed and causing the second surface 192 to be extended. This effect is illustrated in the cross sectional view in FIG. 5. The extension of the first surface 180 of the first sensing tine 160 causes an electric field gradient to be induced in the portion of the crystal 100 proximate to the first surface 180. Since this portion of the crystal 100 is being extended, the induced electric field gradient is in the −X direction (in accordance with the assumed convention) from the first sensing electrode 220 to the third sensing electrode 224, as illustrated by an electric field gradient arrow 410, thus causing the third sensing electrode 224 to be positively charged with respect to the first sensing electrode 220. In contrast, the portion of the crystal 100 proximate to the second surface 182 of the first sensing tine 160 is being compressed, thus causing an electric field gradient in the +X direction, as illustrated by an electric field gradient arrow 412 between the second sensing electrode 222 and the fourth sensing electrode 226.

Since the second sensing tine 162 is deflected in the opposite direction as the first sensing tine 160, the electric field gradient proximate to its first surface 190, as illustrated by an electric field gradient arrow 420 between the fifth sensing electrode 230 and the seventh sensing electric 234, is opposite the electric field gradient of the first surface 180 of the first sensing tine 160. Similarly, the electric field gradient proximate to the second surface 192 of the second sensing tine 162, as illustrated by an electric field gradient arrow 422 between the second sensing electrode 232 and the eighth sensing electric 236, is opposite the electric field gradient proximate to the second surface 182 of the first sensing tine 160. As discussed above, the sensing electrodes of the two sensing tines are electrically cross coupled. Thus, the sensing electrodes having the same polarity electric field gradients are connected together so that the voltages generated by commonly connected electrodes are in phase with each other. The voltage charge caused by the electric field gradients is detected by connecting suitable sensing electronics (shown in phantom as a block 430) to the third bonding pad 272 and the fourth bonding pad 282. For example, the electric field gradients caused by the deflections in the directions illustrated in FIG. 5 cause the fourth bonding pad 282 to be positive with respect to the third bonding pad 272.

When the deflections of the first and second sensing tines are reversed, as illustrated by a directional arrow 430 for the first sensing tine 160 and a directional arrow 432 for the second sensing tine 162, the electric field gradient between the first and third sensing electrodes 220, 224, as illustrated by an electric field gradient arrow 440, reverses. Similarly, the electric field gradient between the second and fourth sensing electrodes 222, 226, illustrated by an electric field gradient arrow 442, the electric field gradient between the fifth and seventh sensing electrodes 230, 234, represented by an electric field gradient arrow 444, and the electric field gradient between the sixth and eighth electrodes 232, 236, represented by an electric field gradient arrow 446, also reverse. Thus, the voltage sensed between the third bonding pad 272 and the fourth bonding pad 282 reverses polarity when the deflections reverse direction.

The voltages induced in the first and second sensing tines 160 and 162 are sensed by suitable sensing electronic circuitry 430 (shown in dashed lines), such as will be described in additional detail below. A representation of the sensed voltages is provided as a sinusoidal output signal that corresponds to the deflection of the first and second sensing tines 160 and 162 in the +Z and −Z directions. The magnitude of the component of the sensed voltages in phase with the velocity of the first and second drive tines 110 and 112 is proportional to the rotation rate and is synchronously detected in a synchronous demodulator to provide an output signal proportional to the rotation rate.

Description of the Operation of the Present Invention to

Sense Linear Acceleration

The foregoing description assumes that the crystal 100 is not being accelerated. In known rotation sensors, using a tuning fork configuration, such has been described heretofore, but without the thin portion 156 of the present invention, the outputs of such rotation sensors are substantially immune to linear acceleration, and thus do not sense such accelerations. As will be described below, the present invention advantageously senses linear acceleration and thus provides a compact, light weight, inexpensive and shock resistant accelerometer.

As set forth above, the present invention includes the thin portion 156 which is disposed from the free second end 140 of the second drive tine 112 so as to define the end mass 198. The thin portion 156 is oriented such that it is narrow in the Z direction while retaining its full cross section in the X direction. Thus, the end mass 198 will tend to deflect in the +Z or −Z direction in response to an acceleration in the Z direction such as may be caused by gravity or other input acceleration.

Figure 12:
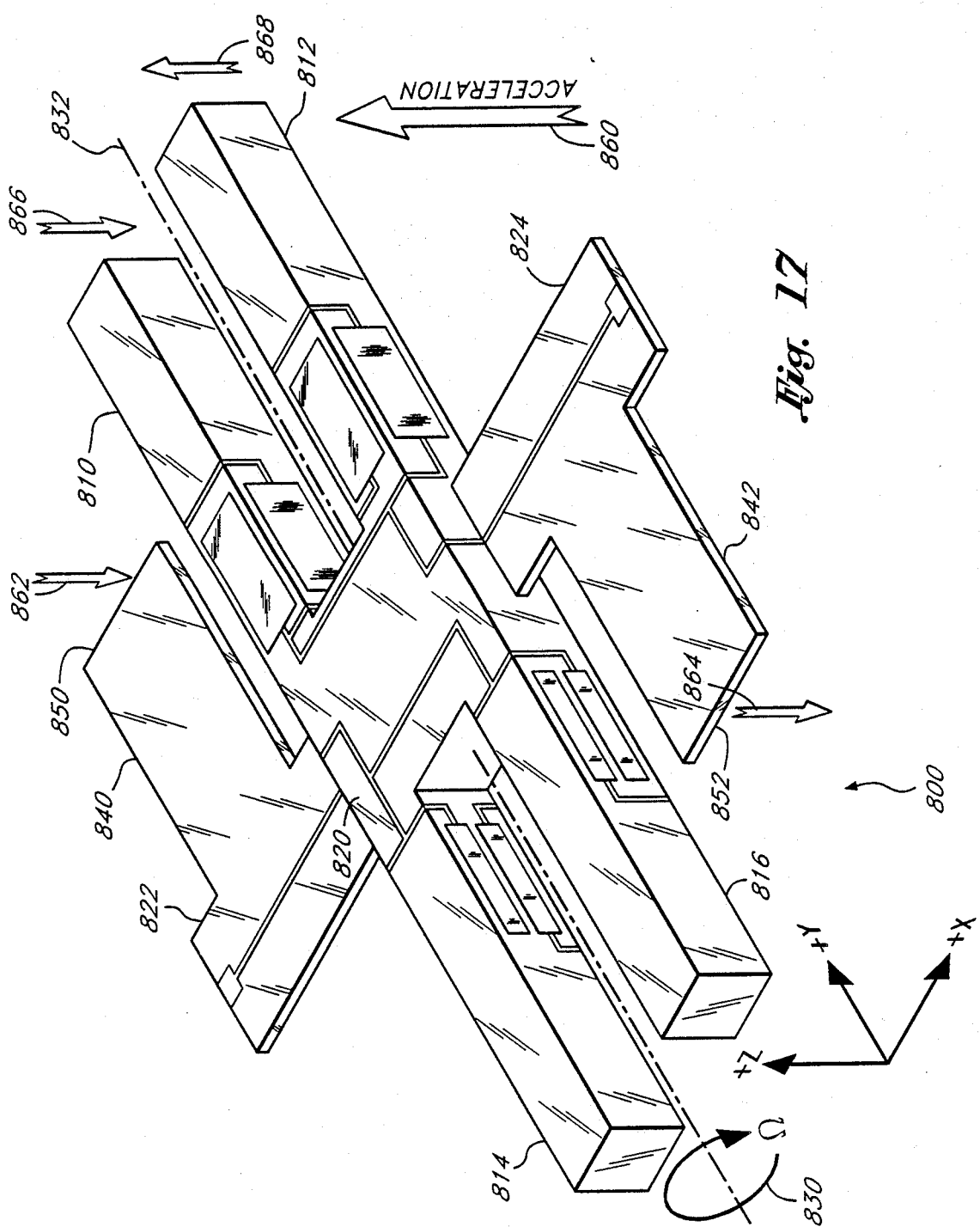
FIG. 12 illustrates an enlarged elevation view of the drive tines of the present invention showing the deflection of the end mass caused by acceleration of the crystal structure in the +Z direction.

FIG. 12 is an elevation view of an enlarged detail of the thin portion 156 and the end mass 198 and shows an exaggerated deflection of the end mass 198 of the second drive tine 112 in the −Z direction relative to the first drive tine 110 when an input acceleration is applied in the +Z direction as indicated by an arrow 450. The nondeflected positions of the thin portion 156 and the end mass 198 are illustrated in phantom, as indicated by the reference numerals 156' and 198', respectively. For clarity and simplification of the discussion to follow, it is assumed that the masses and motions of the two drive tines 110 and 112 are concentrated at the tine ends rather than distributed along the Y length. In addition, it is assumed that the motions of the two drive tines are small enough that linear approximations are adequate for first order calculations.

FIG. 13 illustrates a view of the first drive tine 110 and the second drive tine 112 looking in the −Y direction toward the respective first free ends 140 and 142. The view in FIG. 13 shows both the first drive tine 110 and the end mass 198 at their respective zero positions in the X direction. That is, both tines are halfway between their maximum deflections in the +X and the −X directions. The end mass 198 is shown in solid lines in its deflected position in the −Z direction. The undeflected position of the end mass 198 is represented in phantom as designated by a numeral 198', and the free first end 144 of the second tine is indicated by a numeral 144'.

As indicated by a first velocity vector 460 having its origin at the assumed center of mass of the first drive tine 110 and a second velocity vector 462 having its origin at the assumed center of mass of the undeflected end mass 198', when no linear acceleration is present, the free first end 140 of the first drive tine 110 and the free first end 144' of the second drive tine 112 will move collinearly. That is, the center of mass of the end mass 198' will move towards and away from the center of mass of the first drive tine 110 along the same line as the center of mass of the first drive tine moves toward the center of mass of the end mass 198'. Thus, under the condition of no acceleration, the centers of mass of the two drive tines will reciprocate toward and away from a combined geometric center of motion 464 located at the approximate geometric midpoint of an imaginary line interconnecting the two centers of mass.

The effect of linear acceleration and the consequent deflection of the end mass 198 out of alignment with the first drive tine 110 is illustrated by the solid line representation of the end mass 198. Although the centers of mass of the two drive tines are not now aligned, the reciprocating motion of the tine ends is still parallel since the effect of the applied voltage causes movement of both drive tines in an XY plane. However, the deflection of the end mass 198 causes it to reciprocate in an XY plane that is parallel to the XY plane in which the first drive tine 110 reciprocates. Thus, the end mass 198 moves in the direction of a third velocity vector 470, and it can be seen that the movement of the end mass 198 is no longer collinear with the movement of the first drive tine 110.

As before, the end mass 198 and the first drive tine 110 have a combined geometric center of motion 472 when linear acceleration is present. The combined geometric center of the motion 472 is located approximately half way between the two centers of mass in both the X direction and the Z direction. As discussed above in connection with FIG. 9, when the voltage induced displacements of the two drive tines are going through their zero positions in the drive cycle (i.e., the two tines are located half way between their maximum deflections), the tine velocities are at their respective maxima. The first velocity vector 460 can be resolved into a first radial velocity vector component 480 (i.e., a component toward the combined geometric center of motion 472) and a first tangential velocity vector component 482 perpendicular to the radial velocity vector component 480. Similarly, the third velocity vector 470 can be resolved into a second radial velocity vector component 484 and a second tangential velocity vector component 486.

When the displacements of the two drive tines 110, 112 are at one of their respective maxima, as illustrated in FIGS. 14 and 15, the respective accelerations of the two drive tines 110, 112 in the +X and the −X directions are also at their respective maxima and can be resolved into like radial and tangential acceleration components. For example, FIG. 14, illustrates the positions of the first drive tine 110 and the end mass 198 when the two drive tines are furthest apart (i.e., when the first drive tine 110 has its maximum outward deflection in the −X direction and the second drive tine 112 has its maximum outward deflection in the +X direction). The first drive tine has its maximum acceleration in the +X direction, as illustrated by a first acceleration vector 490. The first acceleration vector 490 can be resolved into a first radial acceleration vector component 492 and a first tangential acceleration vector component 494. Similarly, the end mass 198 of the second drive tine 112 has its maximum acceleration in the −X direction, as illustrated by a second acceleration vector 500. The second acceleration vector 500 can be resolved into a second radial acceleration vector component 502 and a second tangential acceleration vector component 504.

Similarly, as illustrated in FIG. 15 for the position when the two tines are at their closest relative positions, the acceleration of the first drive tine 110 is in the −X direction, as represented by a third acceleration vector 510. The third acceleration vector can be resolved into a third radial acceleration vector component 512 and a third tangential acceleration vector component 514. The end mass 198 of the second drive tine 112 has an acceleration in the +X direction, as represented by a fourth acceleration vector 520. The fourth acceleration vector 520 can be resolved into a fourth radial acceleration vector component 522 and a fourth tangential acceleration vector component 524.

Although exaggerated in FIGS. 12–15, for small deflections under input load, the misalignment between the first drive tine 110 and the end mass 198 is small. Therefore, the radial components of velocity and acceleration for each of the drive tines are nearly equal to their respective original, aligned values, while the tangential components of the acceleration and velocity caused by the misalignment are small.

As set forth above, the radial velocity component, when combined with input rotation of the system about an axis in the Y direction, will result in a tangential acceleration in phase with the velocity of the drive tines in the X direction according to the Coriolis effect, as taught in the prior art. The misalignment due to input acceleration in the Z direction, results in a tangential acceleration in phase with drive acceleration. Since the drive acceleration is 90 degrees out of phase with the drive velocity (i.e., the drive acceleration is in mutual quadrature with the drive velocity), the tangential acceleration caused by the Coriolis effect (i.e., rotation) is in mutual quadrature with the tangential acceleration caused by the input acceleration. The combined tangential accelerations tend to rotate the drive tines 110 and 112 about the Y axis of symmetry coherently with the drive oscillations. The motion of the drive tines is coupled to the sensing tines 160 and 162 to cause deflections of the sensing tines in their respective YZ planes. The deflections will have a component caused by the rotationally induced tangential accelerations and a component caused by the linear acceleration induced tangential accelerations.

As set forth above, the total four tine system of the present invention has an overall torsionally resonant mode of vibration which is excited by the tangential accelerations and which causes the deflections of the drive and pickup tines out of the XY plane. As further discussed above, the electrodes on the first and second sensing tines 160 and 162 will sense the oscillating charges caused by the voltage gradients induced by the flexures of the sensing tines. This sensed signal is indicative of both input rotation rate and linear acceleration and is processed by sensing electronics circuitry described hereinafter.

Description of an Exemplary Circuit for the Present Invention

Figure 6:
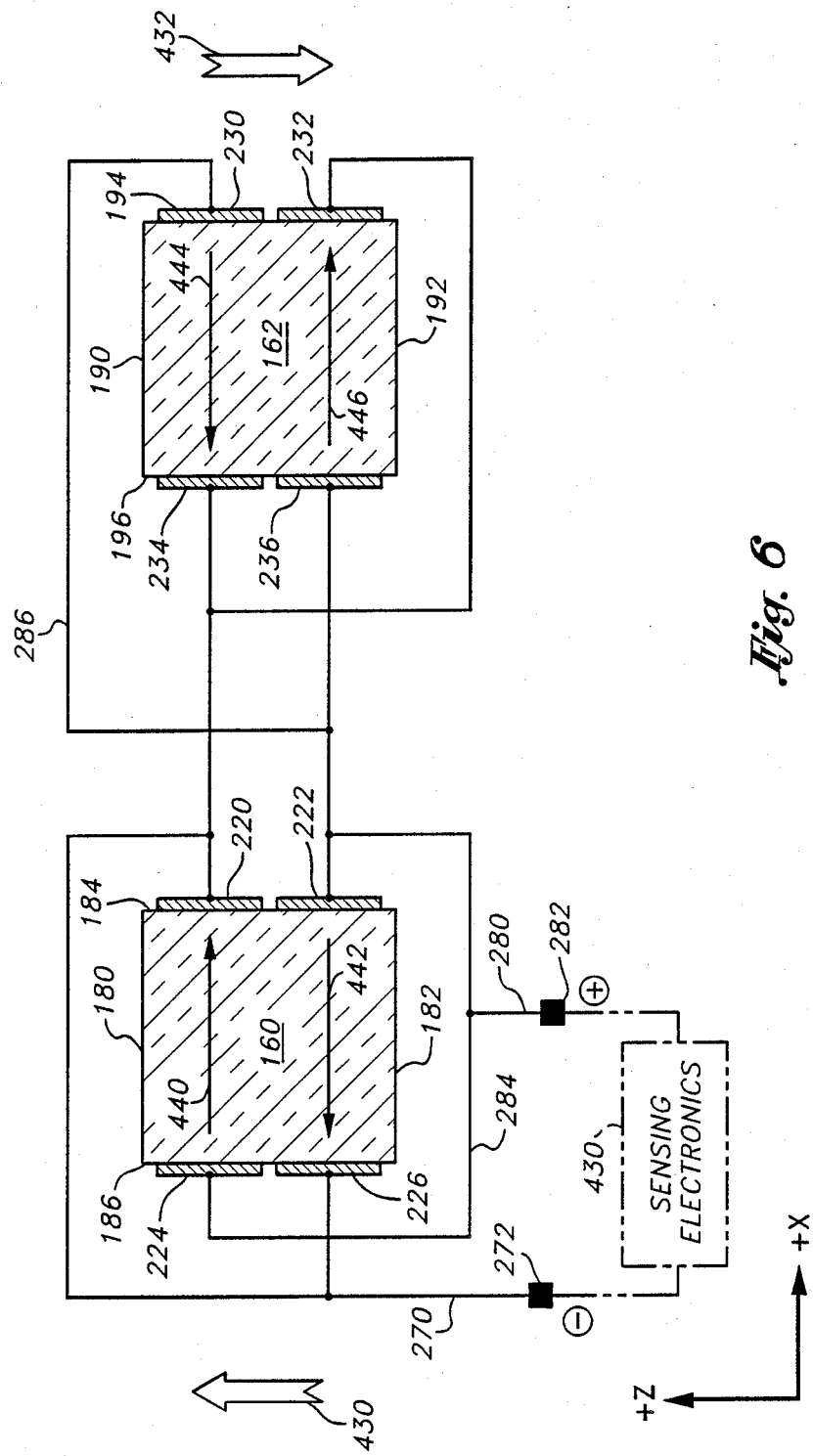
FIG. 6 is a cross section of the pickup tines, similar to FIG. 5, showing the electrode pattern and the voltage gradients induced in the crystal structure caused by flexure in respective second directions, thus causing a voltage of a second polarity on the electrodes.
Figure 16:
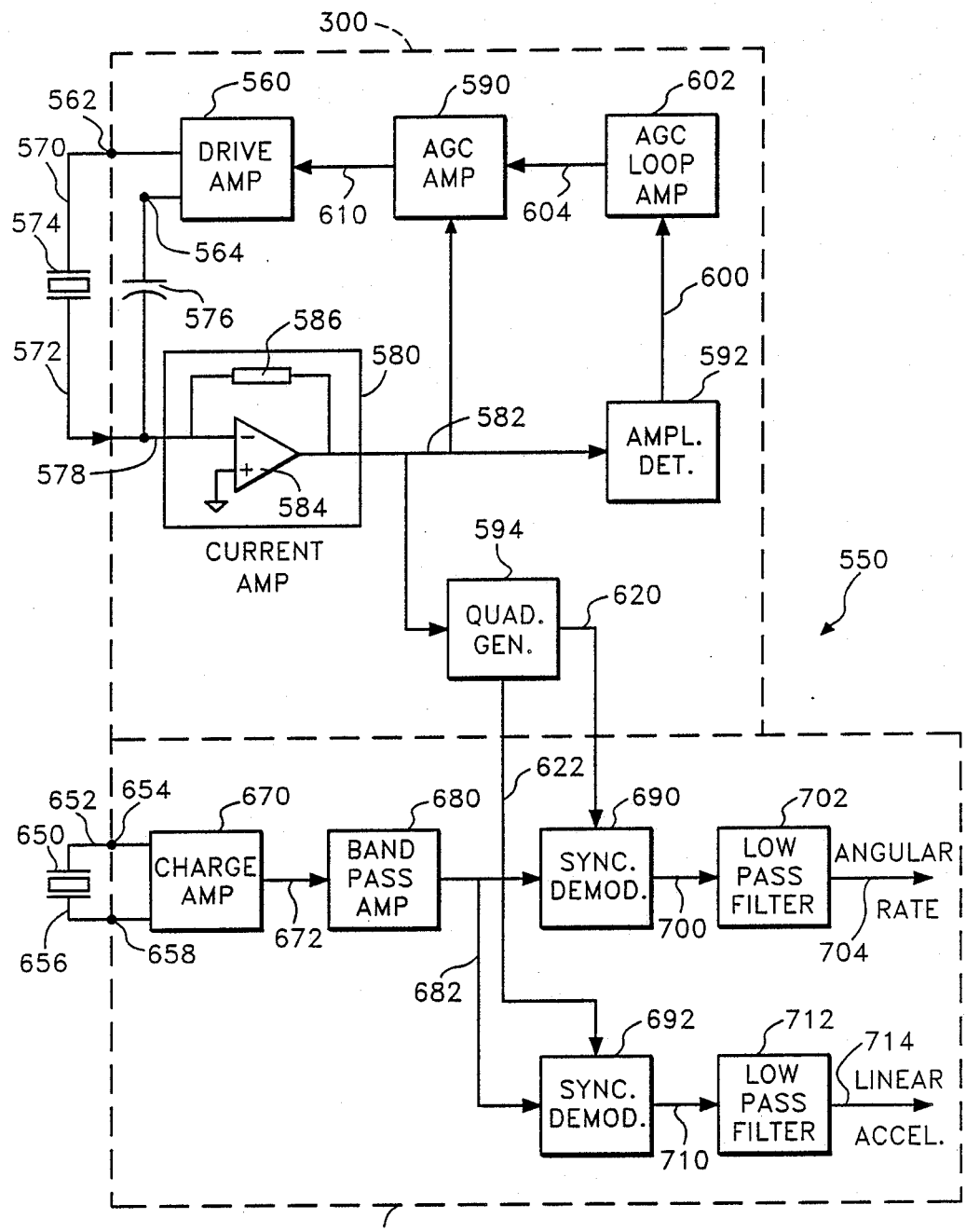
FIG. 16 illustrates a block diagram of an exemplary electronic circuit that provides an oscillating drive voltage to the drive tines and which senses the voltage generated by the sensing tines, and which separates the sensed voltage into a component in phase with the drive velocity corresponding to the angular rotation rate of the crystal structure and into a component in quadrature with the drive velocity corresponding to the linear input acceleration of the crystal structure.

An exemplary electronic circuit 550 for driving the first and second drive tines 110 and 112 and for sensing the charges generated by the strains in the first and second sensing tines 160 and 162 is illustrated in block diagram form in FIG. 16. It should be understood that the electronic circuit 550 generally corresponds to a combination of the simplified oscillator 300 of FIGS. 3 and 4 and the simplified sensing electronics circuit block 430 of FIGS. 5 and 6. The circuit 450 includes a complementary output drive amplifier 560 which provides complementary drive output signals on a first terminal 562 and a second terminal 564. The drive amplifier 560 generates a time-varying voltage on the first terminal 562 that is applied to the drive electrodes 120, 122, 124, 126, 130, 132, 136 and 138 of the first and second drive tines 110 and 112 via a first drive line 570 with respect to a second drive line 572. The terminals 562 and 564 correspond to the first and second terminals 302 and 304 of the oscillator 300 of FIGS. 3 and 4. The combination of the electrodes and the drive tines (i.e., the electrode/drive tine combination) is drawn as a simple crystal electronic resonator 574 (referred to hereinafter as the drive resonator 574) in FIG. 16.

The second drive line 572 is connected via a compensation capacitor 576 to the second terminal 564 and is connected via current amplifier input line 578 to the input of a current amplifier 580. The current amplifier 580 senses the amount of current that results from the time-varying voltage applied to the drive resonator 574 and provides a current amplifier output voltage on a current amplifier output line 582 that is a representation of the series current flowing through the drive resonator 574. Thus, the current amplifier output voltage is representative of the drive tine velocity.

In one particular embodiment, the current amplifier 580 comprises a high gain differential amplifier 584 having an inverting input connected to the current amplifier input line 578 and having a non-inverting input connected to a reference potential (e.g., a circuit ground). The output of the differential amplifier 584 corresponds to the output of the current amplifier 580 and is thus connected to the current amplifier output line 582. The output of the differential amplifier 584 on the line 582 is connected through a resistor 586 to the inverting input on the line 578 and is thus connected to provide negative feedback from the amplifier output to the amplifier input. One skilled in the art will recognize that the inverting input to the differential amplifier 584 on the current amplifier input line 578 is held to a virtual circuit ground potential since the differential amplifier 584 will provide an output voltage having a magnitude such that the current through the feedback resistor 586 will be exactly opposite the current flowing in the second drive line 572. Thus, as set forth above, the current amplifier output voltage on the line 582 represents the series current through the drive resonator 574, and thereby represents the drive tine velocity.

The compensation capacitor 576 connected between the second drive line 572 and the second terminal 564 provides a path to remove extraneous currents that are not representative of the series current of the drive resonator 574 so that such currents do not appear in the feedback resistor 586. Thus, such currents do not affect the current amplifier output voltage on the line 582 and do not affect the representation of the drive tine velocity. Although the capacitor 576 is shown in FIG. 16, one skilled in the art will understand that other known circuit networks can be used for compensation and to assure that the oscillator starts up properly and that the oscillation is sustained.

The current amplifier output signal on the line 582 is provided as a first input to an automatic gain control (AGC) amplifier 590 and is also provided as an input to an amplitude detector 592. The current amplifier output signal on the line 582 is further provided as an input to a quadrature generator 594.

The amplitude detector 592 operates in a conventional manner to rectify the current amplifier output signal and provide a rectified output signal on an amplitude detector output line 600 that has a nominal DC voltage level corresponding to the amplitude of the sensed current. The rectified output signal from the amplitude detector 592 is provided as an input to an automatic gain control (AGC) loop amplifier 602 which provides frequency compensation of dynamic variations in the DC level of the rectified output signal and provides a processed signal on an AGC loop amplifier output line 604. The processed signal on the line 604 is provided as a second input to the AGC amplifier 590. The processed signal controls the amplification factor by which the AGC amplifier 590 amplifies the current amplifier output signal on the current amplifier output line 582.

The AGC amplifier 590 provides an AGC output signal on a first AGC signal line 610 that is provided as an input to the complementary drive amplifier 560. The AGC output signal is amplified by the complementary drive amplifier 560 and is applied to the electrodes of the drive resonator 574, as discussed above.

The above-described elements provide a closed loop system in which the output of the current amplifier 580 is fed back to the complementary drive amplifier 560, thus causing the closed loop system to oscillate. The closed loop circuit and the drive resonator 574 together comprise a series mode oscillator. When sufficient loop gain is provided and the time delays and phase shifts through the amplifier stages are nominally zero, the system oscillates at the natural mechanical resonance of the drive resonator 574, which, in one preferred embodiment, is approximately 12,000 Hz. The secondary AGC loop, comprising the amplitude detector 592 and the AGC loop amplifier 602, maintains adequate gain to sustain oscillation in the primary loop and regulates the amplitude of the drive signal applied to the first and second drive tines 110 and 112 so that the sinusoidal drive velocity has a substantially constant amplitude.

In FIG. 16, the compementary drive amplifier 560, the current amplifier 580, the AGC amplifier 590, and amplitude detector 592 and the AGC loop amplifier 602 are enclosed an a block (dashed lines) 300 to indicate that together they generally correspond to the oscillator 300 in FIGS. 3 and 4.

The quadrature generator 594 is responsive to the output of the current amplifier 580 on the line 582 and generates a first quadrature generator output signal (an in-phase signal) on an in-phase signal line 620 and generates a second quadrature generator output signal (a quadrature signal) on a quadrature signal line 622 in manner known the art. The in-phase signal on the in-phase signal line 620 is in phase with the output of the current amplifier 580 and the quadrature signal on the quadrature signal line is 90 degrees out of phase with the output of the current amplifier 580. The current in the first and second drive tines 110 and 112 is in phase with the velocities of the drive tines. Thus, the in-phase signal is in phase with the tine velocities. Since the quadrature signal is 90 degrees out of phase with the in-phase signal, it is 90 degrees out of phase with the tine velocities. Thus, the quadrature signal is in phase with the tine accelerations. The in-phase signal and the quadrature signal are used as reference signals, as will be discussed below.

The combination of the sensing electrodes and the first and second sensing tines 160 and 162 is represented in FIG. 16 by simple crystal circuit 650, referred to hereinafter as the sensing tine/electrode combination 650. The sensing tine/electrode combination 650 is electrically connected via a first sense line 652 to a first sensing input terminal 654 and via a second sense line 656 to a second sensing input terminal 658. The first sensing input terminal 654 and the second sensing input terminal 656 correspond to the first and second inputs of the sensing portion of the electronic circuit 550. The sensing portion of the electronic circuit 550, generally corresponds to the sensing electronics 430 of FIGS. 5 and 6, and is enclosed by a dashed block 430 in FIG. 16.

The sensing portion of the electronic circuit 550 includes a charge amplifier 670 which has first and second inputs electrically connected to the first and second sensing terminals 654 and 658. The charge amplifier 670 is responsive to the charges on the sensing electrodes of the first and second sensing tines 160 and 162 and is thus responsive to the voltage gradients within the sensing tines induced by the flexing of the sensing tines. The charge amplifier 670 provides a charge amplifier output signal on a charge amplifier output line 672 that is proportional to the voltage differential between the interconnected sets of sensing electrodes. Thus, the charge amplifier output signal is time-varying in accordance with the deflections of the first and second sensing tines 160 and 162 in the +Z and −Z directions. It should be understood that the magnitude of the tine-varying output signal is proportional to the deflections of the first and second sensing tines 160 and 162 and is thus proportional to the tangential accelerations of the first and second drive tines 110 and 112, as discussed above.

The charge amplifier output signal is provided as an input to a bandpass amplifier 680 which amplifies that portion of the charge amplifier output signal that is proximate to the resonant frequency of the first and second drive tines 110 and 112. For example, in the exemplary embodiment described herein, the pass band of the bandpass amplifier is centered around 12,000 Hz.

The bandpass amplifier 680 generates an amplified output signal on a bandpass amplifier output line 682. The amplified output signal is provided to the signal input of a first synchronous demodulator 690 and to the signal input of the second synchronous demodulator 692. The first synchronous demodulator 690 has a drive input that is electrically connected to the in-phase signal output of the quadrature generator 594 via the in-phase signal line 620. The second synchronous demodulator 692 has a drive input that is connected to the quadrature signal output of the quadrature generator 594 via the quadrature signal line 622.

As can be understood from the foregoing description of the operation of the first and second drive tines 110 and 112 and the first and second sensing tines 160 and 162, the voltage sensed by the sensing circuit includes a first component that is synchronous with and in phase with the drive tine velocities and a second component that is also synchronous with the drive tine velocities and the first component, but which is 90 degrees out of phase (i.e., in quadrature) with the drive tine velocities and the first component. The first and second synchronous demodulators 690 and 692 separate the two mutually synchronous quadrature components in a manner known to the art.

The first synchronous demodulator 690 provides a first demodulated output signal on a first demodulator output line 700 that has an amplitude proportional to the component of the deflections of the first and second sensing tines 160 and 162 resulting from the tangential accelerations in phase with the velocities of the first and second drive tines 110 and 112. Thus, the amplitude of the first demodulated output signal on the line 700 is proportional to the input rotation rate around the Y axis of symmetry 116. The first demodulated output signal is provided as an input to a first low-pass filter 702 which removes the high frequency components of the first demodulated output signal (i.e., it removes any residual 12,000 Hz components and harmonics thereof) and provides an angular rate output signal on an angular rate output line 704. The angular rate output signal has a DC voltage magnitude proportional to the angular rate and a DC voltage polarity corresponding to the rotational direction.

The second synchronous demodulator 692 provides a second demodulated output signal on a second demodulator output line 710 that has an amplitude proportional to the component of the deflections of the first and second sensing tines 160 and 162 resulting from the tangential accelerations in phase with the drive accelerations of the first and second drive tines 110 and 112. The defections of the first and second sensing tines 160 and 162 in phase with the drive accelerations are caused by the misalignment of the end mass 198 and are thus caused by linear acceleration of the crystal 100 in the +Z or the −Z directions. Thus, the amplitude of the second demodulated output signal on the line 710 is proportional to the input acceleration of the crystal 100 in the +Z or the −Z direction. The second demodulated output signal is provided as an input to a second low-pass filter 712 which removes the high frequency components of the second demodulated output signal and provides a linear acceleration output signal on a linear acceleration output line 714. The linear acceleration output signal has a DC voltage magnitude proportional to the magnitude of the linear acceleration and a DC voltage polarity corresponding to the +Z or the −Z direction of the input acceleration.

An exemplary embodiment of the present invention, has the tine dimensions described above, has a quartz density of 2.65 grams per centimeter, and has a drive voltage selected to provide 0.001 inch (25.4 micrometers) of tine deflection at 12,000 Hz. For this example, the peak drive tine velocity will be approximately 76 inches per second (1930 millimeters per second) and the peak drive tine acceleration will be approximately 15,000 g peak. The Coriolis acceleration $\vec{a}_C$ is given by the vector crossproduct:

$$\vec{a}_C = 2\vec{\Omega} \times \vec{v} \qquad (1)$$

where $\vec{\Omega}$ is the input rate and $\vec{v}$ is the mass velocity. For example, a full scale rotation of the crystal 100 of 100 degrees per second produces 0.7 g of tangential acceleration caused by the Coriolis effect.

When subjected to approximately one g of input acceleration, the exemplary thin portion 156 and the end mass 198 provide a deflection of the end mass 198 of approximately $2 \times 10^{-8}$ inches (approximately 1 micrometer) in the +Z or −Z direction. This deflection produces a component of drive acceleration in the tangential direction of about 0.056 g, or the equivalent of approximately 8 degrees per second of Coriolis input rate. A 12.5 g input acceleration in the +Z or −Z direction produces a tangential acceleration component of about 0.7 g and thus results in the equivalent of approximately 100 degrees per second of rotation rate. As set forth above, the tangential acceleration resulting from the rotation rate is in phase with the drive tine velocities and the tangential acceleration resulting from the linear acceleration is 90 degrees out of phase with the drive tine velocities. The two tangential accelerations are thus distinguishable by quadrature demodulation as discussed above.

The above described device advantageously provides both rotation rate sensing and linear acceleration sensing and thus provides multisensing capabilities. For some applications, it is desirable to enhance the linear acceleration sensing capabilities of the invention. The above choices of values are merely illustrative and any number of other combinations are possible to optimize particular performance. For example, it has been found that the ratio of the magnitude of the acceleration sensitive output to the rate sensitive output can be given by:

$$\rho = zf/(2\Omega R) \qquad (2)$$

where z is the deflection of the end mass 198 in the +Z or −Z direction per g of input acceleration in a Z direction; f is the drive frequency; R is the distance from the Y axis of symmetry 116 to the center of each drive tine; and $\Omega$ is the rotation rate input. A generally smaller structure to increase the frequency f and to decrease the distance R will result in a larger value for $\rho$, thus enhancing the linear acceleration sensitivity relative to the angular rate sensitivity.

The foregoing is a description of a particular embodiment of a system in which a first set of driven vibrating elements (e.g., the first and second drive tines 110 and 112) is driven to vibrate in a balanced vibration mode in a first plane in the absence of acceleration. When the acceleration is applied, at least one of the driven vibrating elements (e.g., the second drive tine 112) is caused to vibrate in a second plane, thus causing the first set of vibrating elements to vibrate in an unbalanced vibration mode. The vibration of the vibrating elements in the unbalanced vibration mode causes energy to be coupled to a sensing system (e.g., the first and second sensing tines 160 and 162) causing the sensing system to vibrate in a sensing vibration mode. The energy coupled to the sensing system and causing the vibration in the sensing vibration mode is detected by a detection system (e.g., the sensing circuit 430) which provides an output signal responsive to the applied acceleration.

Description of the Embodiment of FIG. 17

It should be understood that other vibrating systems can be caused to provide the above-described response to an applied input acceleration. For example, FIG. 17 illustrates an alternative embodiment of the present invention having a similar configuration to the previously described embodiment. As illustrated in FIG. 17, this embodiment is a four tine structure 800 having a first drive tine 810, second drive tine 812, a first sensing tine 814 and a second sensing tine 816. The four tines are connected to a common body portion 820 which in turn is connected to a first bridge portion 822 and a second bridge portion 824. The first and drive tines 810 and 812 and the first and second sensing tines 814 and 816 have electrodes on the surfaces thereof that are similar to those described above for the crystal structure 100 in FIGS. 1 and 2. Although only four drive electrodes and four sensing electrodes are shown in FIG. 17, it should be understood that the other electrodes are on the hidden sides of the structure 800.

The structure 800 of FIG. 17 operates in a similar manner to that described above in connection with the preferred embodiment of FIGS. 1 and 2 and the electrical characteristics are similar. Thus, a detailed operation of the embodiment of FIG. 17 will not be repeated herein.

It should be further understood that the structural characteristics of the embodiment of FIG. 17 enabling it to sense rotation (represented by a circle 830) about an axis of symmetry 832 are also substantially the same as previously described. On the other hand, the structure 800 includes a different feature to cause the tine imbalance that provides the capability to sense linear acceleration. As set forth above, the embodiment of FIGS. 1 and 2 included the thin portion 156 which defined the end mass portion 198 that was deflected out of the drive plane in response to acceleration. The embodiment of FIG. 17 includes a first proof mass 840 connected to the first bridge portion 822 and a second proof mass 842 connected to the second bridge portion 824. The first proof mass 840 lies in an XY plane and extends in a direction parallel to the first and second drive tines 810 and 812 (i.e., in the Y direction with the convention shown in FIG. 17). The second proof mass 842 also lies in an XY plane; however, in the embodiment shown, it extends in the opposite direction from the first proof mass 840. Thus, it extends in a direction parallel to the first and second sensing tines 814 and 816 in the −X direction.

The first proof mass 840 has a free end 850 and the second proof mass 842 has a free end 852. The free ends 850 and 852 are disposed such the first and second proof masses 840 and 842 have centers of gravity disposed from the respective first and second bridge portions 822 and 824, thus causing the centers of masses of the two proof masses to exert leverage on the respective bridge portions when the two proof masses are subjected to acceleration. The leverage thus exerted induces a torque in the two bridge portions 822, 824 which is communicated through the body portion 820 to the first and second drive tines 810 and 812 and the first and second sensing tines 814 and 816. The torque causes the drive tines and the sensing tines to be deflected out of their respective planes.

It can be seen that when the structure 800 is accelerated in the +Z direction, as indicated by a first arrow 860, the first and second proof masses 840 and 842 are deflected in the −Z direction, as indicated by a second arrow 862 and a third arrow 864 in FIG. 17. The deflections of the two proof masses 840, 842 cause the first drive tine 810 to be deflected in the −Z direction, and the second drive tine 812 will be deflected in the +Z direction, as indicated by a fourth arrow 864 and a fifth arrow 868, respectively. The first and second drive tines 810 and 812 are caused to vibrate in different planes, thus inducing a vibratory effect in the first and second sensing tines 814 and 816, as discussed above in connection with FIGS. 12–15. However, in the embodiment of FIG. 17, both drive tines are deflected out of the initial drive plane. The vibrations induced in the first and second sensing tines cause an oscillating voltage, as discussed above, which can be sensed and demodulated by a circuit such as the circuit 550 of FIG. 16.

Description of the Embodiment of FIGS. 18–21

Figures 18, 19:
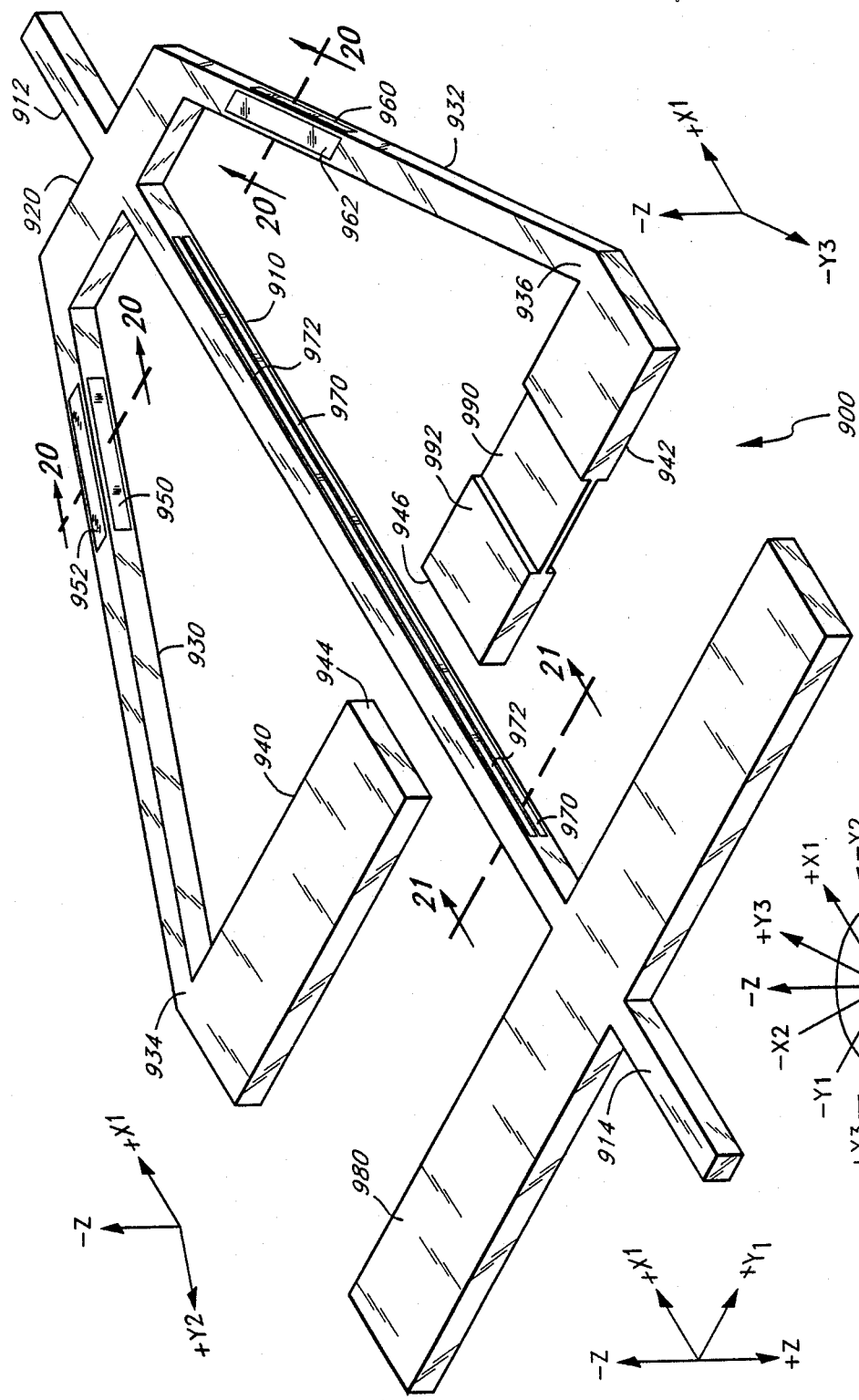
FIG. 18 is a perspective view of an embodiment having an alternative drive tine configuration and in which the sensing electrodes are positioned to sense the torsion applied to a common shaft.
FIG. 19 illustrates a perspective view of the axes of the crystal structure of FIG. 18 showing the plural X axes and the plural Y axes.

As a further example of an alternative embodiment of the present invention, FIG. 18 illustrates an acceleration and rotation sensing structure 900 in which the sensing electrodes are positioned on a common shaft 910 rather than on sensing tines. A rotation sensor having a similar structure to the structure 900 is described in connection with FIG. 1 of U.S. Pat. No. 4,538,461.

Before describing the structure 900 of FIG. 18, reference is made to a perspective illustration of the axes of a typical crystal structure in FIG. 19. Although described above in connection with the usual three orthogonal axes of a three-dimensional structure, it should be understood that many exemplary crystal structures include plural X and Y axes. For the example of quartz, there are three of each axis, as illustrated in FIG. 19. A first X axis, indicated by the +X1 and the −X1 arrow and a first Y axis, indicated by the +Y1 and −Y1 arrow, are orthogonal, as before, and both are mutually orthogonal to the Z axis. The crystal structure also has two other X axes, an X2 axis, represented by a +X2 and −X2 arrow, and an X3 axis, represented by a +X3 and −X3 arrow. As illustrated, the X2 axis and the X3 axis are 120 degrees apart from each other and 120 degrees apart from the X1 axis. Similarly, a Y2 axis, represented by a +Y2 and −Y2 axis, and a Y3 axis, represented by a +Y3 and −Y3 arrow, are 120 degrees apart and 120 degrees apart from the Y1 axis. Although the various Y axes are not perpendicular to all the X axes in the three dimensional coordinate sense, it should be understood that for the purposes of describing the piezoelectric characteristics of the structure 900, all the Y axes are electrically perpendicular to all the X axes. The structure 900 of FIG. 18 utilizes the additional Y axes to advantage.

As illustrated in FIG. 18, the common shaft 910 is disposed in the +X1 direction, for example. The common shaft 910 has a first end 912 and a second end 914 which are advantageously used to mount the structure 900 to an external support structure (not shown). Furthermore, the first and second ends 912 and 914 of the common shaft 910 advantageously include circuit paths (not shown) to provide electrical interconnections between electrodes (to be discussed below) and an external electrical circuit (for example, a circuit similar to the circuit 550 of FIG. 16).

A common base 920 is provided proximate to the first end 912 of the common shaft 910. The common base 920 lies in the X1Y1 plane, as defined in FIG. 19 and is generally perpendicular to the common shaft 910 in the +Y1 and −Y1 directions. The common base 920 serves as a common mounting structure for a first drive tine 930 and a second drive tine 932. The first drive tine 930 extends from the common base 920 in the +Y2 direction, and the second drive tine 932 extends from the common base in the −Y3 direction. As illustrated, the first drive tine 930 and the second drive tine 932 extend in directions that are 60 degrees apart from each other with respect to a physical coordinate system. However, the two drive tines 930 and 932 extend in directions that are 180 degrees apart in the sense of the piezoelectric structure of the crystal, as discussed above.

The first drive tine 930 has a free end 934 that is disposed away from the common base 920 in the +Y2 direction. Similarly, the second drive tine 932 has a free end 936 that is disposed away from the common base 920 in the −Y3 direction. A first vibratory mass 940 is provided that is connected to the first drive tine 930 at the free end 934. The first vibratory mass 940 lies in the X1Y1 plane and extends from the free end 934 towards the common shaft 910 in the +Y1 direction. Similarly, a second vibratorY mass 942 is connected to the free end 936 of the second drive tine, and extends from the free end 936 toward the common shaft 910 in the −Y1 direction. The first vibratory mass 940 has a free end 944 proximate to the common shaft 910, and the second vibratory mass 942 has a free end 946 proximate to the common shaft 910.

Figure 20:
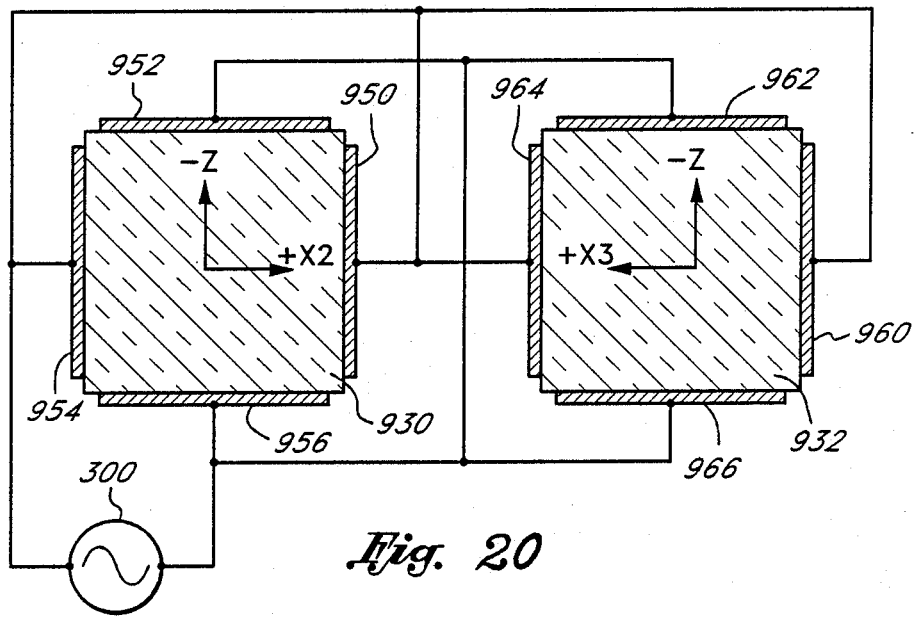
FIG. 20 illustrates a cross section of the first and second drive tines of the embodiment of FIG. 18 taken along the lines 20—20 in FIG. 18.
Figure 21:
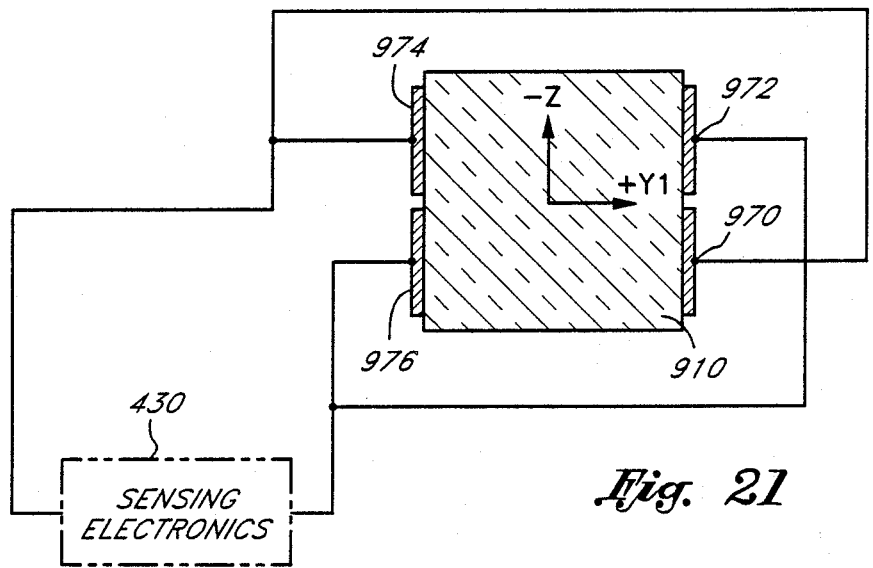
FIG. 21 illustrates a cross section of the common shaft of the embodiment of FIG. 18 taken along the lines 21—21 in FIG. 18.

The first drive tine 930 has a set of four drive electrodes 950, 952, 954 and 956, only two of which (950 and 952) are shown in FIG. 18. The other two drive electrodes (954 and 956) are hidden in the view of FIG. 18 and are shown in cross section in FIG. 20. In like manner, the second drive tine 912 has a set of four drive electrodes 960, 962, 964 and 966, of which two (960 and 962) are shown in FIG. 18 and the other two (964 and 9660 are shown in FIG. 20. The drive electrodes operate as was discussed above in connection with the preferred embodiment of FIGS. 1 and 2. However, since the first drive tine 930 extends in the +Y2 direction, and the second drive tine 932 extends in the −Y3 direction, it is not necessary to electrically cross-couple the electrode interconnections. Rather, the difference in the Y directions (i.e., + versus −), causes the deflections of the Y tines to be in opposite directions when the same voltage is applied to each tine. Thus, the corresponding electrodes of the two drive tines 930, 932 are electrically interconnected, as illustrated in FIG. 20, and are connected to an oscillating voltage source, such as the voltage source 300, corresponding to the drive portion of the circuit 550 of FIG. 16.

When an oscillating voltage from the source 300 is applied to the drive electrodes, the first drive tine 930 and the second drive tine 932 to vibrate in their respective XY planes. The vibration of the first and second drive tines 930 and 932 cause the first and second vibratory masses 940 and 942 to move towards and away from each other generally in the +Y1 and −Y1 directions, although it should be understood that the centers of gravity of the vibratory masses 930, 932 will actually travel slightly arcuate paths.

As before, any rotation of the structure 900 about an axis parallel to the common shaft 910 causes a torsion to be induced in the common body base portion 920. However, since there are no sensing tines in this embodiment, the torsion is coupled to the common shaft 910 and causes the common shaft 910 to twist. Thus, the common shaft 910 is caused to vibrate in a torsional mode. The twisting or torsional vibration of the common shaft 910 induces piezoelectric shear strains in the crystal structure of the common shaft 910 which are detectable by a set of four electrodes 970, 972, 974 and 976, of which the electrodes 970 and 972 are shown in FIG. 18, and the electrodes 974 and 976 are shown only in a cross-sectional view in FIG. 21. The voltages induced by the twisting of the common shaft 910 are electrically coupled to a sensing circuit 430, such as the sensing portion of the circuit 550 of FIG. 16.

In order to prevent the coupling of the twisting motion to the external support structure (not shown), the embodiment of FIG. 18 includes a counter balancing mass 980 which is connected to the common shaft 910 proximate to the second end 914. The counter balancing mass 980 lies in the X1Y1 plane and extends from the common shaft 910 in the +X1 and −X1 directions. The mass of the counter balancing mass 980 is selected to be approximately equal to the mass of the vibrating drive tines 930, 932 and their associated vibratory masses 940 and 942 so that the overall structure is a resonant structure. The counter balancing mass 980 counter balances the twisting motion caused by the vibrating tine structure and reduces the net torque coupled to the first end 912 and the second end 914 of the common shaft 910.

Figure 22:
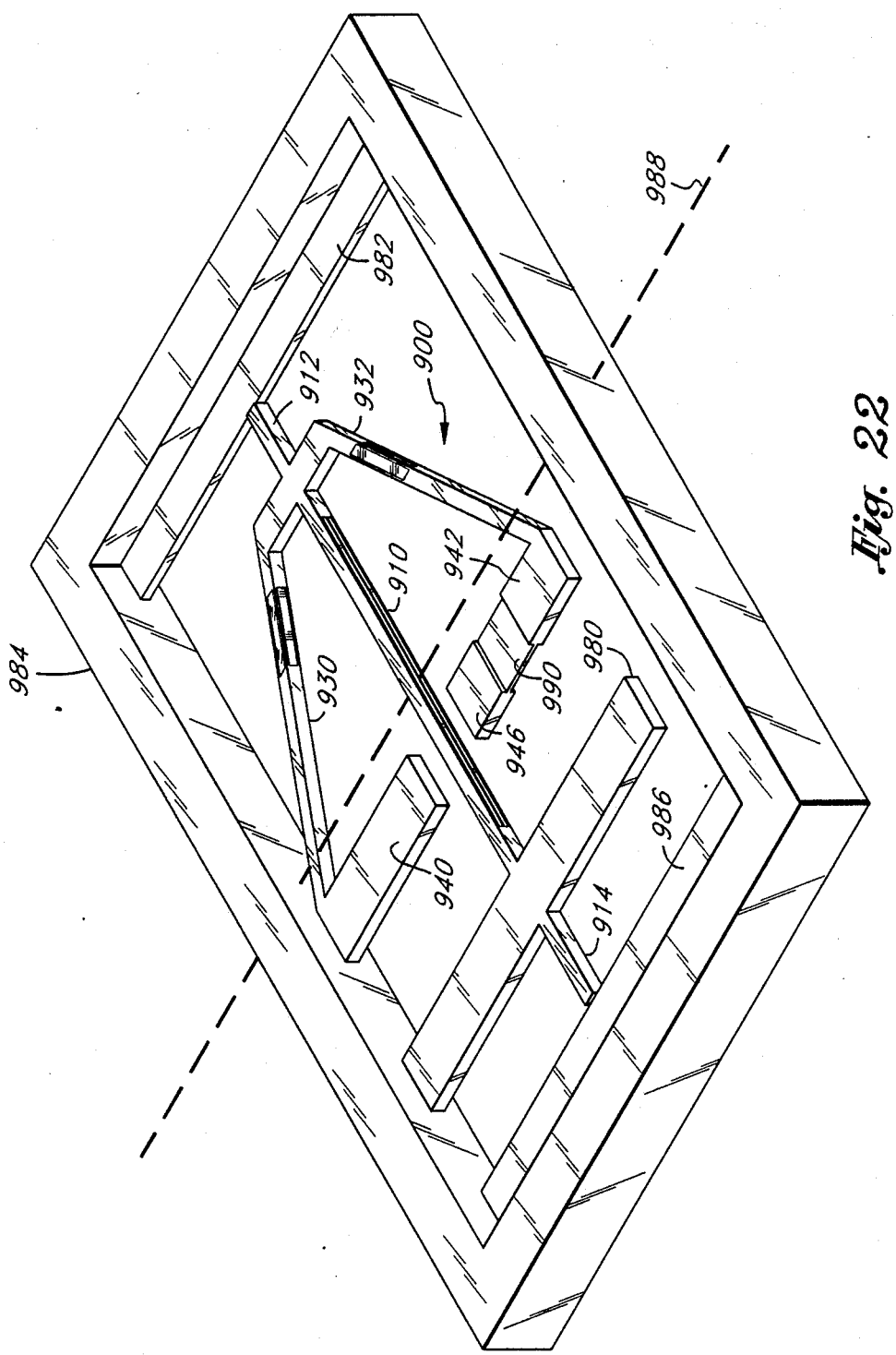
FIG. 22 illustrates the embodiment of FIG. 18 mounted in a rectangular frame structure to isolate the torque generated in the vibratory structure from an external mounting structure (not shown).

In certain exemplary embodiments, as illustrated in FIG. 22, the first end 912 is mounted to a first bridge structure 982 which is in turn mounted to a rectangular frame structure 984. In like manner, the second end 914 is mounted to a second bridge structure 986 which is mounted to the rectangular frame structure 984. As illustrated, the first and second bridge structures 982 and 986 have relatively thin cross sections compared to the rectangular frame structure 984 and compared to the first and second ends 912 and 914. Thus, the two bridge structures 982, 986 are relatively flexible compared to the frame structure 984. The net torque coupled to the first and second ends 912 and 914 causes very small movements of the first and second ends 912 and 914. A substantial portion of the small movements are absorbed by the bridge structures 982, 986 so that very little torque is coupled to the rectangular frame structure 984. It can be seen that the torque coupled to the rectangular frame structure 984 from the first end 912 will be in the opposite direction from the torque coupled to the rectangular frame structure 984 from the second end 914. The approximate center of the rectangular frame structure 984 between the first bridge structure 980 and the second bridge structure 982, illustrated by a center line 988, will have a net torque substantially equal to zero. Thus, the rectangular frame structure can advantageously be mounted to the external structure (not shown) by appropriate mounting means contacting the rectangular frame structure 984 at the center line 988. By so mounting, the torque coupled from the vibratory structure 900 to the external structure via the rectangular frame structure 984 will be minimal.

In order to sense acceleration in the +Z direction or the −Z direction, the second vibratory mass 942 is provided with a thin portion 990 disposed between the free end 936 of the second drive tine 932 and the free end 946 of the second vibratory mass 942. The thin portion 990 is thin in the Z direction. The full cross-sectional portion of the second vibratory mass 942 between the thin portion 990 and the free end 946 defines an end mass portion 992. The thin portion 990 allows the end mass portion 992 to deflect in one of the +Z and −Z directions in response to acceleration in the other of the +Z and −Z directions so that the end mass 992 vibrates in a plane different from the plane in which the first vibratory mass 940 vibrates. The vibration of the two tine systems in different planes causes the time varying deflections of the two drive tines 930, 932 in the +Z and −Z directions as described abovelanes causes the time varying deflections of the two drive tines 930, 932 in the +Z and −Z directions as described above in connection with the preferred embodiment of FIGS. 1 and 2. This time varying deflection is coupled to the common shaft 910 to cause twisting of the common shaft 910 that is 90 degrees out of phase with the twisting caused by rotation. Thus, the sensing electrodes 970, 972, 974 and 976 will sense a voltage that is out of phase with the voltage caused by rotation. The two out-of-phase voltages can be separated by the synchronous demodulators of FIG. 16, as discussed above.

Although disclosed above in accordance with a specific embodiments of the present invention, it should be understood by those skilled in the art that changes and modifications may be made to the disclosed invention without departing from the spirit and the scope of the present invention, as defined in the appended claims.

What is claimed is:

1. An apparatus for sensing acceleration, comprising:
   a tuning fork formed from a single crystal of piezoelectric material, said tuning fork comprising:
      first and second drive tines disposed in a common plane, said first and second drive tines having free first ends and commonly mounted second ends, said tuning fork including drive electrodes disposed on surfaces of said first and second drive tines, said first and second drive tine responsive to a periodic voltage applied to said drive electrodes to cause said free first ends of said first and second drive tines to vibrate in said common plane, said first tine including an intermediate portion proximate to said free first end of said first tine, said intermediate portion having increased flexibility in first and second directions perpendicular to said common plane, said increased flexibility causing said free second end of said first tine to deflect in said first direction when said tuning fork is subjected to acceleration in said second direction thereby causing said free second end of said first tine to vibrate in a plane parallel to said common plane and causing a torsional effect on said second ends of said first and second tines, said torsional effect synchronized with said vibrations of said first and second tines;
      first and second sensing tines, commonly mounted with said first and second drive tines, said first and second sensing tines having sensing electrodes disposed on surfaces thereof, said first and second sensing tines responsive to said torsional effect to vibrate in said first and second directions, the vibration of said first and second sensing tines generating voltage gradients within said first and second sensing tines detectable by said sensing electrodes, said voltage gradients varying in time and having phases and magnitudes responsive to the magnitude and direction of said acceleration.

2. The apparatus for sensing acceleration as defined in claim 1, wherein said tuning fork has a resonant frequency, said apparatus further including means for generating said periodic voltage at said resonant frequency.

3. The apparatus for sensing acceleration as defined in claim 1, further including a sensing circuit electrically connected to said sensing electrodes, said sensing circuit responsive to said voltage gradients within said first and second sensing tines to generate a sensing circuit output signal having a magnitude proportional to the acceleration of said tuning fork in said second direction.

4. The apparatus for sensing acceleration as defined in claim 1, wherein said first and second drive tines are symmetrically disposed about an axis in said common plane, and wherein said first and second drive tines are responsive to a component of angular rotation about said axis to cause an additional torsional effect on said second ends of said first and second tines, said additional torsional effect also synchronized with said vibrations of said first and second tines, said additional torsional effect being out of phase with said torsional effect caused by said acceleration and distinguishable therefrom, said additional torsional effect also causing vibration in said first and second tines.

5. The apparatus for sensing acceleration as defined in claim 4, further including a sensing circuit electrically connected to said sensing electrodes, said sensing circuit responsive to said voltage gradients within said first and second sensing tines to generate a first sensing circuit output signal having a magnitude representing the acceleration of said tuning fork in said second direction and to generate a second sensing circuit output signal having a magnitude representing the component of angular rotation about said axis.

6. The apparatus for sensing acceleration as defined in claim 5, wherein said voltage gradients within said first and second sensing tines include first components responsive to said torsional effect caused by said acceleration and second components caused by said additional torsional effect caused by said component of angular rotation.

7. The apparatus for sensing acceleration as defined in claim 6, wherein said sensing circuit includes first and second synchronous demodulators, said first and second synchronous demodulators electrically connected to receive an input signal responsive to said voltage gradients in said first and second sensing tines, said first synchronous demodulator driven by a reference signal having a first phase relationship to the vibration of said first and second drive tines, said second synchronous demodulator having a second phase relationship to the vibration of said first and second tines, said first and second phase relationships being 90 degrees out of phase with each other, said first synchronous demodulator providing a first demodulator output signal responsive to said acceleration, said second synchronous demodulator providing a second demodulator output signal responsive to said component of angular rotation.

8. An apparatus for sensing acceleration, comprising:
   a common base;
   a first vibrating element connected to said common base that vibrates in a first plane;
   a second vibrating element that vibrates in said first plane, said second vibrating element having an end portion supported by an intermediate portion, said intermediate portion having enhanced flexibility in directions perpendicular to said first plane, and said end portion responsive to a component of acceleration in one of said perpendicular directions to cause said end portion to vibrate in a second plan parallel to said first vibration plane thereby causing a torsional effect at said common base;

a first sensing element connected to said common base, said first sensing element vibrating in a third plane, perpendicular to said first plane in response to said torsional effect at said base, said first sensing element including sensing electrodes for sensing an electrical effect induced in said first sensing element when said first sensing element is vibrating in said third plane; and a sensing circuit connected to said sensing electrodes that receives said sensed electrical effect and that generates an output signal having a magnitude representing said component of acceleration.

9. A system for measuring acceleration, comprising:

first vibrating means having plural elements;

means for driving said first vibrating means so that said elements of said first vibrating means vibrate in a balanced vibration mode in the absence of acceleration;

means responsive to acceleration for causing said elements of said first vibrating means to vibrate in an unbalanced vibration mode in the presence of acceleration;

second vibrating means coupled to receive energy from said first vibrating means for vibrating in a sensing vibration mode when said first vibrating means vibrates in said unbalanced vibration mode, said sensing vibration mode having an amplitude and a phase responsive to said unbalanced vibration mode of said first vibrating means caused by acceleration; and means coupled to said second vibrating means for sensing vibration in said sensing vibration mode and for providing an output signal responsive to said vibration in said sensing vibration mode, said output signal having an amplitude and a phase responsive to said amplitude and said phase of said sensing vibration mode.

10. A system for sensing acceleration, comprising:

first and second vibrating elements that vibrate in a balanced mode in a common plane in the absence of acceleration;

means for causing said first vibrating element to vibrate in a plane different from said second vibrating element in the presence of acceleration to cause said first and second vibrating elements to vibrate in an unbalanced mode;

sensing means;

means for coupling energy from said first and second vibrating elements to said sensing means when said first and second vibrating elements vibrate in said unbalanced mode; and means for detecting said energy coupled to said sensing means and for providing an output signal responsive to said input acceleration.

* * * * *